United States Patent
Bader

(10) Patent No.: US 11,010,606 B1
(45) Date of Patent: May 18, 2021

(54) CLOUD DETECTION FROM SATELLITE IMAGERY

(71) Applicant: Maxar Intelligence Inc., Westminster, CO (US)

(72) Inventor: Brett W. Bader, Lyons, CO (US)

(73) Assignee: Maxar Intelligence Inc., Westminster, CO (US)

( * ) Notice: Subject to any disclaimer, the term of this patent is extended or adjusted under 35 U.S.C. 154(b) by 35 days.

(21) Appl. No.: 16/685,609

(22) Filed: Nov. 15, 2019

(51) Int. Cl.
*G06K 9/00* (2006.01)
*G06T 7/254* (2017.01)
*G06K 9/62* (2006.01)

(52) U.S. Cl.
CPC ....... *G06K 9/0063* (2013.01); *G06K 9/00664* (2013.01); *G06K 9/6202* (2013.01); *G06T 7/254* (2017.01); *G06T 2207/10032* (2013.01); *G06T 2207/30192* (2013.01)

(58) Field of Classification Search
CPC ............. G06K 9/0063; G06K 9/00664; G06K 9/6202; G06T 7/254; G06T 2207/30192; G06T 2207/10032
See application file for complete search history.

(56) References Cited

U.S. PATENT DOCUMENTS

| | | | |
|---|---|---|---|
| 5,612,901 A * | 3/1997 | Gallegos | G06K 9/0063 348/144 |
| 8,626,682 B2 | 1/2014 | Malik et al. | |
| 9,001,311 B2 | 4/2015 | Leonard et al. | |
| 9,230,168 B2 | 1/2016 | Gueguen | |
| 9,396,528 B2 | 7/2016 | Pacifici | |
| 9,466,144 B2 | 10/2016 | Sharp et al. | |
| 9,495,635 B2 | 11/2016 | Malik et al. | |

(Continued)

FOREIGN PATENT DOCUMENTS

| | | |
|---|---|---|
| CN | 103292930 A | 9/2013 |
| KR | 10-1922831 B1 | 11/2018 |

OTHER PUBLICATIONS

WU et al., "Automatic Cloud Detection For High Resolution Satellite Stereo Images And Its Application In Terrain Extraction", ISPRS Journal of Photogrammetry and Remote Sensing 121,2016 (Year: 2016).*

(Continued)

*Primary Examiner* — Aaron W Carter
(74) *Attorney, Agent, or Firm* — Vierra Magen Marcus LLP

(57) ABSTRACT

Described herein are methods and systems for detecting clouds in satellite imagery captured using first and second sensor arrays that are carried by a satellite and physically offset from one another on the satellite. Movement mask data is produced based first image data and the second image data, obtained, respectively, using the first and second sensor arrays carried by the satellite. Cloud mask data is produced based on spectral information included one of the first and second image data. Cloud detection data is produced based on the movement mask data and the cloud mask data, the cloud detection data indicating where it is likely, based on both the movement mask data and the cloud mask data, that one or more clouds are represented within one of the first and second image data. The cloud detection data can be used in various ways to account for the clouds included within the satellite imagery.

21 Claims, 12 Drawing Sheets

(56) References Cited

U.S. PATENT DOCUMENTS

| | | | |
|---|---|---|---|
| 9,565,377 B2* | 2/2017 | Hamann | H04N 5/3591 |
| 9,589,210 B1 | 3/2017 | Estrada et al. | |
| 9,990,705 B2 | 6/2018 | Pacifici | |
| 10,289,925 B2 | 5/2019 | Farooqi et al. | |
| 10,761,242 B1* | 9/2020 | Mecikalski | G01W 1/16 |
| 10,928,845 B2* | 2/2021 | Williams | G06N 5/048 |
| 2011/0064280 A1* | 3/2011 | Sasakawa | G06T 3/4038 |
| | | | 382/113 |
| 2012/0155704 A1* | 6/2012 | Williams | G06K 9/0063 |
| | | | 382/103 |
| 2013/0223676 A1* | 8/2013 | Guan | G06T 7/97 |
| | | | 382/103 |
| 2013/0258068 A1* | 10/2013 | Schmidt | H01L 31/02021 |
| | | | 348/49 |
| 2014/0012427 A1* | 1/2014 | Katayama | H02J 13/00034 |
| | | | 700/291 |
| 2014/0278108 A1* | 9/2014 | Kerrigan | G01W 1/10 |
| | | | 702/3 |
| 2015/0371089 A1 | 12/2015 | Tabb | |
| 2015/0371115 A1 | 12/2015 | Marchisio et al. | |
| 2015/0379431 A1 | 12/2015 | Stokes et al. | |
| 2016/0026848 A1 | 1/2016 | Hamid et al. | |
| 2016/0104059 A1* | 4/2016 | Wang | G06K 9/00335 |
| | | | 382/103 |
| 2017/0235767 A1 | 8/2017 | Tusk | |
| 2017/0270674 A1 | 9/2017 | Shrivastava | |
| 2019/0130547 A1 | 5/2019 | Pacitici | |
| 2019/0163768 A1 | 5/2019 | Gulati et al. | |
| 2019/0286875 A1* | 9/2019 | Batchelor | G06T 5/50 |
| 2019/0294923 A1 | 9/2019 | Riley et al. | |
| 2019/0325581 A1* | 10/2019 | Yan | G06T 7/13 |
| 2020/0125844 A1* | 4/2020 | She | G06Q 50/02 |
| 2020/0142095 A1* | 5/2020 | Yan | G06K 9/6215 |

OTHER PUBLICATIONS

Digitalglobe, "WorldView-3," Data Sheet, [www.digitalglobe.com], DS-WV3 Rev. 01/13, Jan. 2013, 2 pages.

* cited by examiner

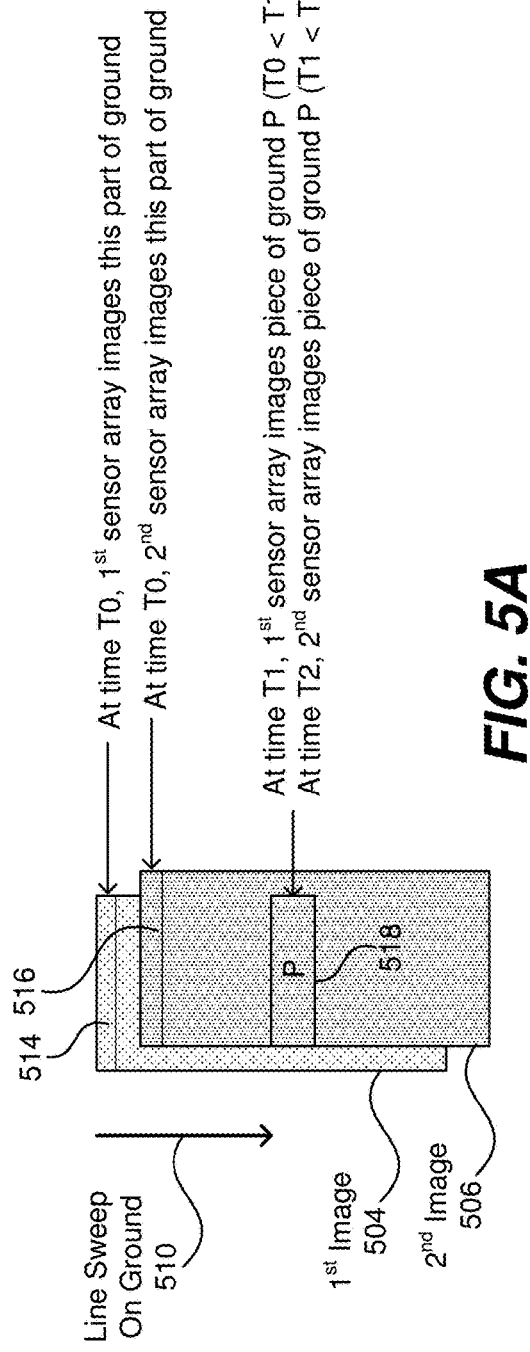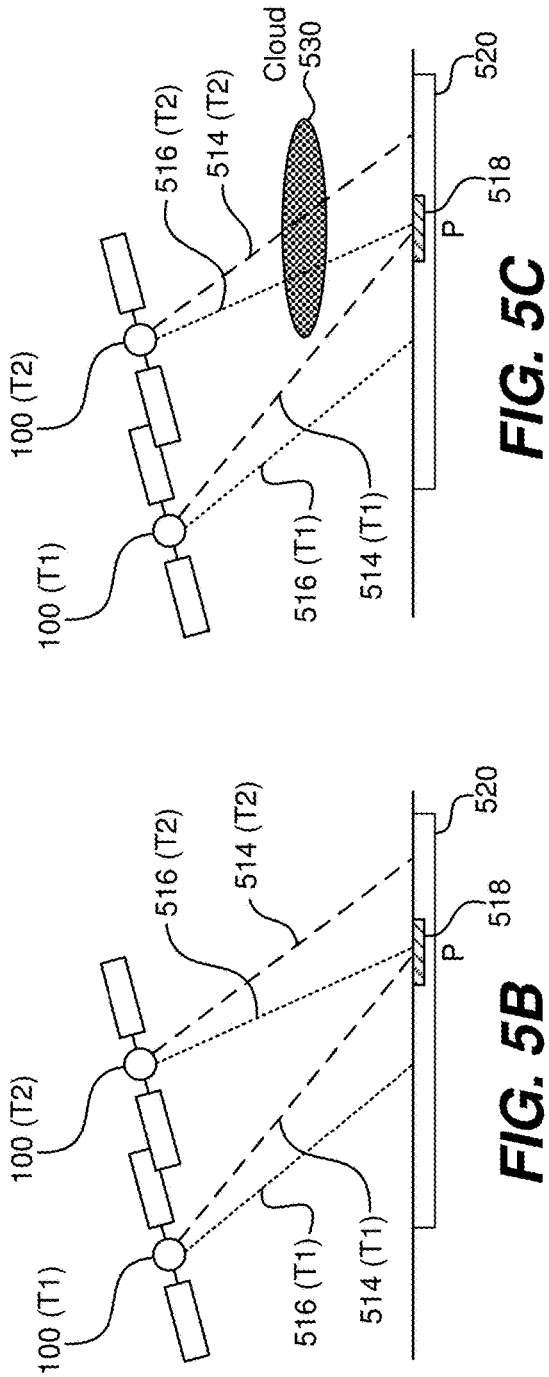

CLOUD DETECTION FROM SATELLITE IMAGERY

FIELD

This disclosure generally relates to systems and methods for detecting clouds within satellite imagery.

BACKGROUND

The use of geospatial imagery (e.g., satellite imagery) has continued to increase in recent years. As such, high quality geospatial imagery has become increasingly valuable. For example, a variety of different entities (e.g., government entities, corporations, universities, individuals, or others) may utilize satellite imagery. As may be appreciated, the use of such satellite imagery may vary widely such that satellite images may be used for a variety of differing purposes.

At any given time, a significant portion of the surface of the earth is obstructed from imaging by a satellite due to the presence of clouds. Accordingly, it is useful to be able to detect clouds within images so that the detected clouds can be masked out of the images if desired. For example, it is important to mask out clouds from images where image alignment (aka registration) requires stationary land pixels. For another example, where customers want imagery free of clouds, by beginning with a large archive of imagery that includes clouds, cloud-free portions of images can be selected and stitched together to produce large cloud-free mosaics. For still another example, where change detection algorithms are used to detect land development and/or deforestation from multiple different images of the same geographic region captured at different times, clouds, if not accounted for, can adversely affect the accuracy of such change detection algorithms.

While some techniques have been used in the past to detect clouds, such techniques often provide inaccurate results. For example, prior techniques that detect clouds based on the color, size, shape, and/or texture of objects within an image often produce false positives where the images include snow and/or ice covered land, or other large swaths of land or water that appear white and/or highly reflective. More generally, with previous cloud detection techniques, snow, ice, bright building rooftops, and bright desert and/or other geologic features often cause false positives. Accordingly, there is still a need for improved techniques for cloud detection.

BRIEF DESCRIPTION OF THE DRAWINGS

Aspects of the present disclosure are illustrated by way of example and are not limited by the accompanying figures for which like references indicate like elements.

FIG. 5A illustrates how first and second images, which are slightly offset from one another, are captured respectively by first and second sensor arrays that are physically offset from one another on a satellite.

FIG. 5B shows the satellite (moving along an orbital path) at first and second times, wherein the satellite has first and second senor arrays that are physically offset from one another, and wherein the first sensor array captures a first image of a piece of ground at a first time, and the second sensor array captures a second image of that same piece of ground at a second time.

FIG. 5C is similar to FIG. 5B, except also shows a cloud between the satellite and the ground at the second time, wherein the cloud can be detected by comparing the first image of the piece of ground (captured by the first sensor array at the first time) to the second image of the piece of ground (captured by the second sensor array at the second time).

DETAILED DESCRIPTION

Embodiments of the present technology generally relate to improved techniques for cloud detection, and more specifically, to methods and system for performing cloud detection. In accordance with certain embodiments, movement mask data is produced based on first image data and the second image data, obtained, respectively, using first and second sensor arrays that are physically offset from one another and carried by a satellite. Movement mask data is produced by comparing the first image data and the second image data (or first and second edge image data produced therefrom) to identify dissimilarities therebetween. Additionally, cloud mask data can be produced based on spectral information included in one of the first and second image data. Cloud detection data is then produced based on the movement mask data and the cloud mask data, wherein the cloud detection data indicates where it is likely that one or more clouds are represented within one of the first and second image data. The cloud detection data can be used in various ways to account for the clouds included within the satellite imagery. Before providing additional details such embodiments of the present technology, an example system with which embodiments of the present technology may be used will first be described with reference to FIGS. 1 and 2.

Figure 1:
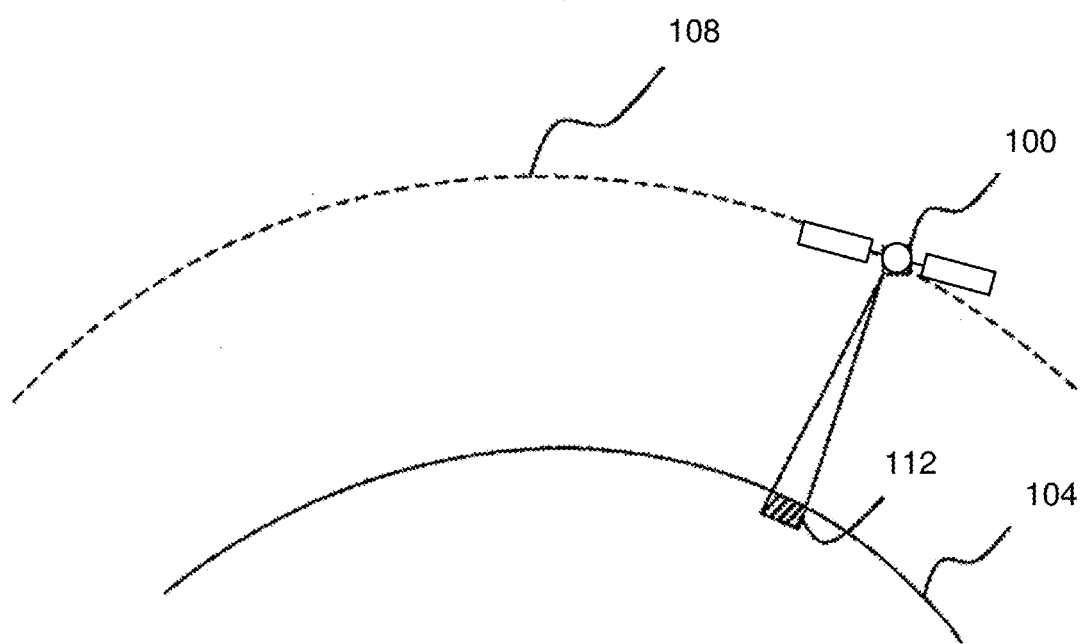
FIG. 1 illustrates how a satellite orbiting a planet can be used to obtain images of the earth.

Referring to FIG. 1, an illustration of a satellite 100 orbiting a planet 104 is shown. At the outset, it is noted that, when referring to the earth herein, reference is made to any celestial body of which it may be desirable to acquire images or other remote sensing information. Furthermore, when referring to a satellite herein, reference is made to any spacecraft, satellite, and/or aircraft capable of acquiring images or other remote sensing information. Furthermore, the system described herein may also be applied to other imaging systems, including imaging systems located on the earth or in space that acquire images of other celestial bodies. It is also noted that none of the drawing figures contained herein are drawn to scale, and that such figures are for the purposes of discussion and illustration only.

As illustrated in FIG. 1, the satellite 100 orbits the earth 104 following an orbital path 108. An imaging system aboard the satellite 100 is capable of acquiring one or more images of a portion 112 of the surface of the earth 104, which portion 112 can also be referred to as a geographic region. As will be discussed in further detail below, when there are clouds located between the satellite 100 and the portion 112 of the surface of the earth 104 being imaged by the satellite 100, the image(s) obtained by the satellite 100 may include such clouds, which may obscure or otherwise obfuscate certain features on the surface of the earth. Embodiments of the present technology, as will be discussed below, can be used to detect clouds within images obtained by the satellite, and more specifically, by sensor arrays carried by the satellite.

An image that is obtained by the satellite 100 includes a plurality of pixels. Furthermore, the satellite 100 may collect images in a number of spectral bands. In certain embodiments, the imaging system aboard the satellite 100 collects multiple bands of electromagnetic energy, wherein each band is collected by a separate image sensor that is adapted to collect electromagnetic radiation within a corresponding spectral range. More specifically, an image obtained by the imaging system aboard the satellite 100 can be a multispectral image (MSI) where image data is captured at specific wavelength bands across the electromagnetic spectrum. That is, one or more image sensors (e.g., provided on a satellite imaging system) may have a plurality of specifically designed sensor portions capable of detecting light within a predetermined range of wavelengths.

For a specific example, the WorldView-2 low earth orbiting satellite operated by DigitalGlobe, Inc. (which is part of Maxar Technologies Inc. of Westminster, Colo.), collects image data in 8 spectral bands, including, for example, a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), and a near-infrared 2 (N2) band (860-1040 nm). For another example, the WorldView-3 low earth orbiting satellite operated by DigitalGlobe, Inc., in addition to collecting image data in the 8 spectral bands mentioned above (i.e., the C, B, G, Y, R, RE, N1, and N2 bands), also includes sensors to obtain image data in an additional 8 spectral bands that are in the short-wavelength infrared range (SWIR). Such SWIR bands may include, for example, SWIR 1 (1195-1225 nm), SWIR 2 (1550-1590 nm), SWIR 3 (1640-1680 nm), SWIR 4 (1710-1750 nm), SWIR 5 (2145-2185 nm), SWIR 6 (2185-2225 nm), SWIR 7 (2235-2285 nm), and/or SWIR 8 (2295-2365 nm). Other combinations and/or ranges of SWIR bands generally from about 1195 nm to about 2400 nm may be provided in any combination. Each of the SWIR bands can be referred to more succinctly as an S band, e.g., the SWIR 1 band can also be referred to as the S1 band, the SWIR 2 band can be referred to as the S2 band, etc.

In some embodiments, band definitions broader and/or narrower than those described above may be provided without limitation. In any regard, there may be a plurality of band values corresponding to gray level values for each band for each given pixel in a portion of multispectral image data. There may also be a panchromatic sensor capable of detecting black and white imagery (also referred to as a panchromatic band) in the wavelength band of 450-800 nm. In additional to including spectral information, the image data obtained by a satellite imaging system may include metadata that includes supplementary data regarding the acquisition of the image. For instance, image metadata that may accompany and/or form a portion of the image data may include satellite parameters (e.g., off nadir satellite angles, satellite attitudes, solar elevation angles, etc.), time/date of acquisition, and/or other appropriate parameters may be attributed to the metadata of an image.

Figure 2:
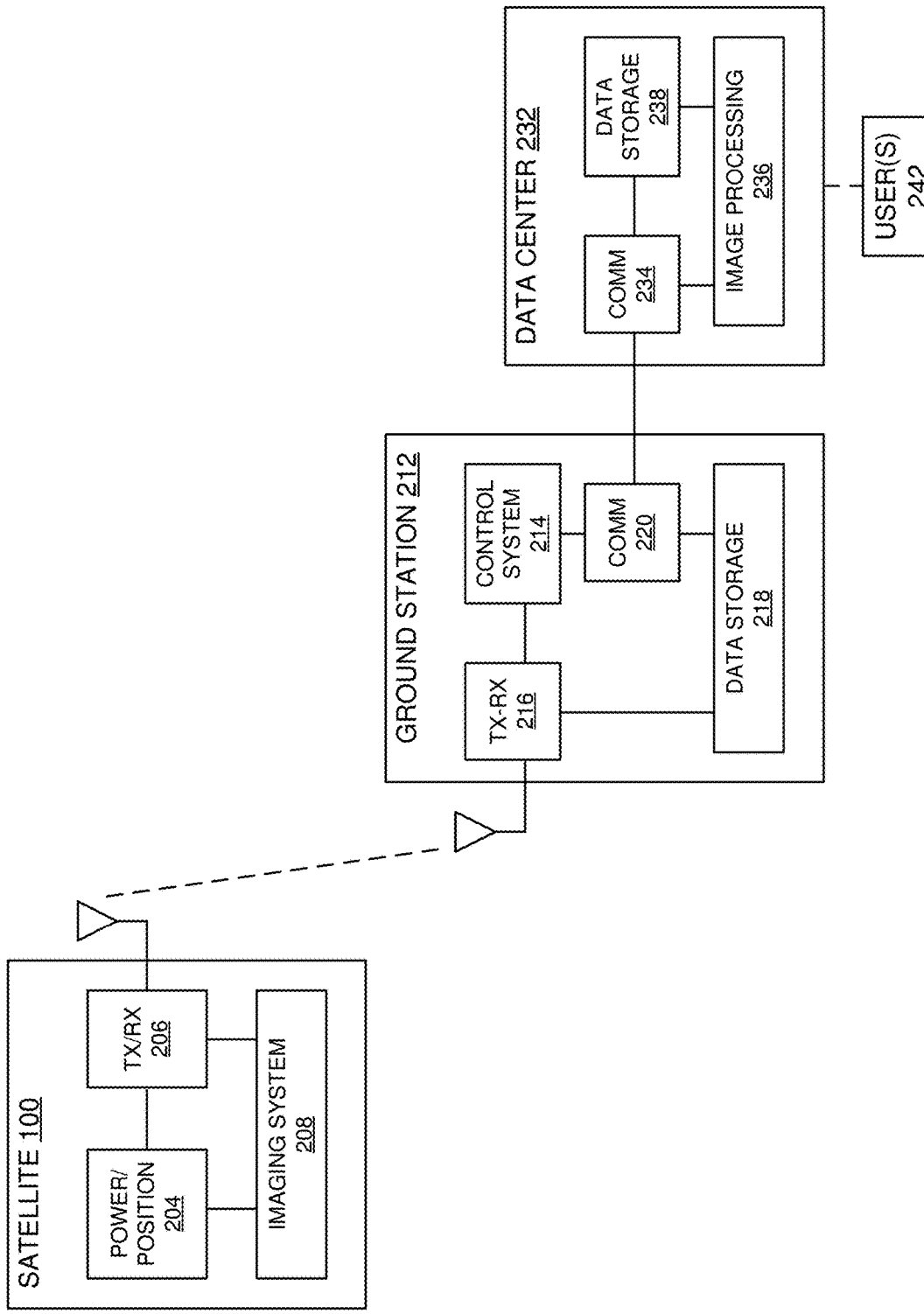
FIG. 2 is a high level block diagram of an image collection and distribution system that can be used to implement various embodiments of the present technology.

Referring now to FIG. 2, a block diagram representation of an image collection and distribution system 200 is shown therein. In this embodiment, the satellite 100 includes a number of subsystems, including power/positioning subsystem 204, a transmit/receive subsystem 206, and an imaging subsystem 208. Each of the aforementioned subsystems can also be referred to more succinctly as a system, e.g., the imaging subsystem 208 can also be referred to as the imaging system 208. The power/positioning subsystem 204 receives power and can be used to position that satellite 100 and/or the imaging system 208 to collect desired images, as is well known in the art. The TX/RX subsystem 206 can be used to transmit and receive data to/from a ground location and/or other satellite systems, as is well known in the art. The imaging system 208, in certain embodiments, includes one or more multispectral (MS) sensor arrays that collect electromagnetic energy within multiple (e.g., 4, 8, or 16) bands of electromagnetic energy, wherein a band of electromagnetic energy can also be referred to as a range of frequencies. In other words, each of the sensors collects electromagnetic energy falling within a respective preset energy band that is received at the sensor. Examples of such bands were discussed above. The imaging sensors, which can also be referred to as image sensors, can include charge coupled device (CCD) arrays and associated optics to collect electromagnetic energy and focus the energy at the CCD arrays. The CCD arrays can be configured to collect energy from a specific energy band by a mass of optical filters. The sensors can also include electronics to sample the CCD arrays and output a digital number (DN) that is proportional to the amount of energy collected at the CCD array. Each CCD array includes a number of pixels, and in accordance with certain embodiments, the imaging system operates as a push broom imaging system. Thus, a plurality DNs for each pixel can be output from the imaging system to the transmit/receive system 206. The use of other types of sensors, besides a CCD array, is also possible and within the scope of the embodiments described herein. For a nonlimiting example, an alternative type of sensor that can be used in place of CCD type sensors is complementary metal-oxide-semiconductor (CMOS) type sensors.

The satellite 100 transmits and receives data from a ground station 212. The ground station 212 of this embodiment includes a transmit/receive system 216, a data storage system 218, a control system 214, and a communication system 220, each of which can also be referred to as a subsystem. While only one ground station 212 is shown in FIG. 2, it is likely that multiple ground stations 212 exist and are able to communicate with the satellite 100 throughout different portions of the satellite's orbit. The transmit/receive system 216 is used to send and receive data to and from the satellite 100. The data storage system 218 may be used to store image data collected by the imaging system 208 and sent from the satellite 100 to the ground station 212. The control system 214 can be used for satellite control and can transmit/receive control information through the transmit/receive system 216 to/from the satellite 100. The communication system 220 is used for communications between the ground station 212 and one or more data centers 232. The data center 232 includes a communication system 234, a data storage system 238, and an image processing system 236, each of which can also be referred to as a subsystem. The image processing system 236 processes the data from the imaging system 208 and provides a digital image to one or more user(s) 242. Certain operations of the image processing system 236, according to certain embodiments of the present technology, will be described in greater detail below. Alternatively, the image data received from the satellite 100 at the ground station 212 may be sent from the ground station 212 to a user 242 directly. The image data may be processed by the user using one or more techniques described herein to accommodate the user's needs.

Figure 3A:
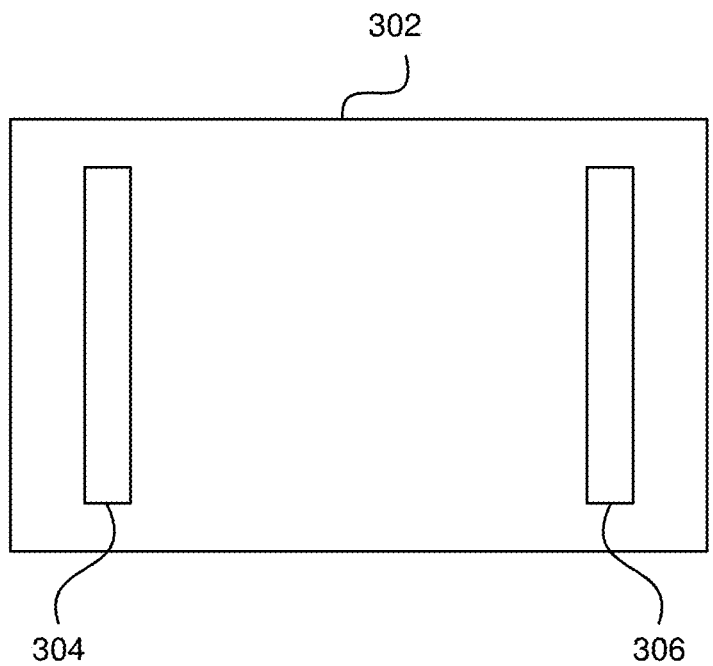
FIG. 3A illustrates an example top view of a sensor assembly that can be carried by a satellite.
Figure 3B:
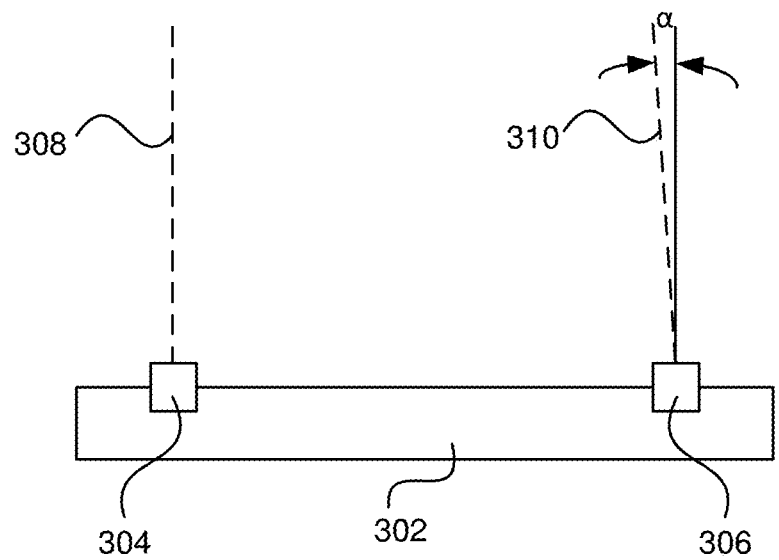
FIG. 3B illustrates an example side view of the sensor assembly.

FIG. 3A illustrates an example top view of a sensor assembly 302 of the imaging system 208 that can be carried by the satellite 100, and FIG. 3B illustrates an example side view of the sensor assembly 302. More specifically referring to FIGS. 3A and 3B, the imaging system 208 can include first and second multispectral (MS) sensor arrays 304 and 306, which can also be referred to as the MS1 sensor array 304 and the MS2 sensor array 306. The MS1 sensor array 304 and the MS2 sensor array 306 can be considered parts of the sensor assembly 302 that is carried by the satellite 100. Each of the MS1 and MS2 sensor arrays 304, 306 can include thousands of image sensors generally aligned in one or more rows arranged generally perpendicular to the flight direction of the satellite 100, thereby enabling images to be captured one or more rows at a time, as is done in a push broom imaging system. FIGS. 3A and 3B can be referred to hereinafter collectively as FIG. 3.

In an embodiment, the MS1 sensor array 304 includes one or more rows of image sensors that collect image date in the blue (B) band (450-510 nm), green (G) band (510-580 nm), red (R) band (630-690 nm), and near-infrared 1 (N1) band (770-895 nm); and the MS2 sensor array 306 includes one or more rows of image sensors that collect image data in the coastal (C) band (400-450 nm), yellow (Y) band (585-625 nm), red edge (RE) band (705-745 nm), and near-infrared 2 (N2) band (860-1040 nm). In other words, the MS1 sensor array 304 collects spectral image data in the B, G, R, and N1 bands; and the MS2 sensor array 306 collects spectral image data in the C, Y, RE, and N2 bands.

As can be appreciated from FIG. 3, the MS1 sensor array 304 and the MS2 sensor array 306 are physically spaced apart from one another. Referring to FIG. 3, the MS1 sensor array 304 is designed together with an optical system of the satellite to receive radiant optical energy along a first primary axis 308, and the MS2 sensor array 306 is designed together with the optical system of the satellite to receive radiant optical energy along a second primary axis 310, wherein an angle α between the first and second primary axes 308, 310 can also be referred to as a parallax angle α. The parallax angle α, which specifies the angular offset between the primary axes 308, 310, can be in the range of 0.05 degrees to 5 degrees, and in specific embodiments, is about 0.16 degrees, but is not limited thereto. As will be appreciated from the discussion below, certain embodiments of the present technology exploit the fact that the MS1 sensor array 304 and the MS2 sensor array 306 are physically and angularly offset from one another.

There is a physical separation between the MS1 sensor array 304 and the MS2 sensor array 306 at a focal plane of the sensor assembly 302 that includes both sensor arrays, as can be appreciated from FIG. 3. The MS1 sensor array 304 can be used to produce a first image of a portion of the surface of the earth, while the MS2 sensor array 306 produces a second image of a portion of the surface of the earth. Because of the physical separation between the sensors arrays 304 and 306 at the focal plane of the sensor assembly 302, the first and second images (producing using the sensor arrays 304 and 306, respectively) will have slight offsets at their the top, bottom, and sides of the images, as will be described in further detail with reference to FIGS. 4 and 5. Each image that is obtained by a sensor array includes image data, which can include spectral data and metadata, but is not limited thereto.

Figure 4:
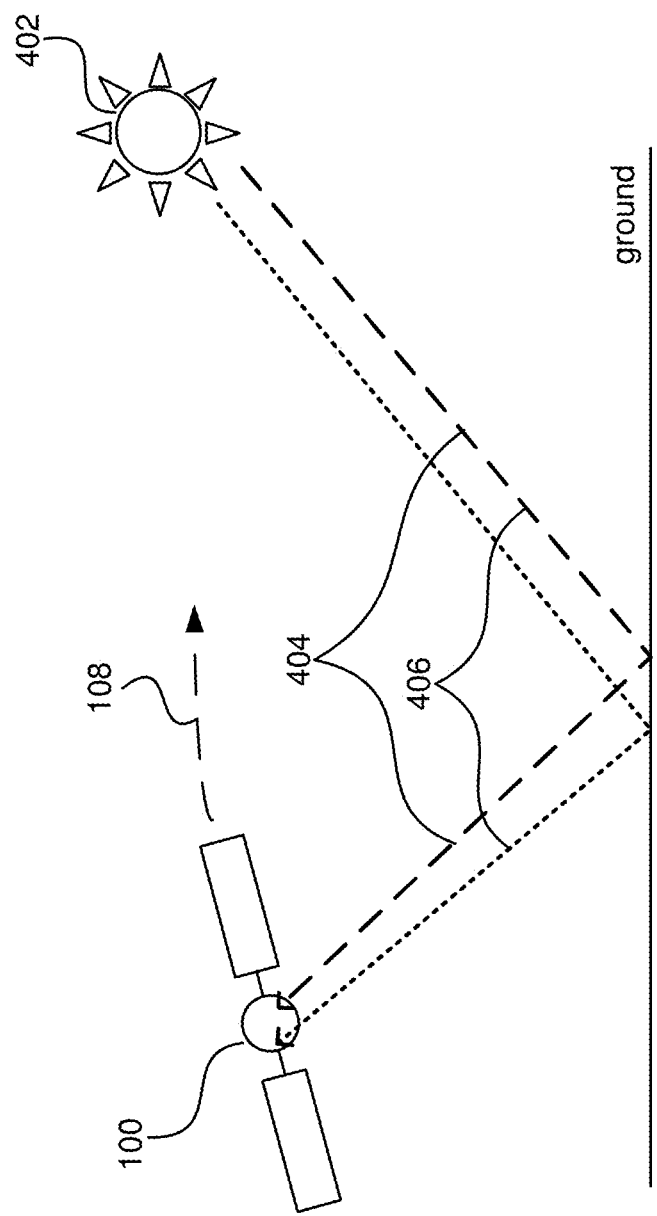
FIG. 4 illustrates how a satellite moving along an orbital path, and having first and second sensor arrays that are physically offset from one another, can obtain first and second images (which differ from one another) of a same portion of the surface of the earth.

Referring to FIG. 4, shown therein is the satellite 100 moving along the orbital path 108. FIG. 4 also shows that light emitted from the sun 402 is reflected off the surface of the earth towards the satellite 100 such that first and second images of a portion of the surface of the earth are captured by the MS1 and MS2 sensor arrays, respectively. More specifically, the emitted and reflect light labeled 404 is imaged by the MS1 sensor array 304 to produce the first image, and the emitted and reflected light labeled 406 is imaged by the MS2 sensor array 306 to produce the second image. Explained another way, the MS1 sensor array can be said to obtain first image data, and the MS2 sensor array can be said to obtain second image data.

FIG. 5A illustrates how first and second images 504, 506, which are slightly offset from one another, are captured respectively by first and second sensor arrays that are physically offset from one another on the satellite 100. Such first and second sensor arrays can be the MS1 sensor array 304 and the MS2 sensor array 306, discussed above, but are not limited thereto. The arrowed line labeled 510 in FIG. 5A represents the line sweep on the ground of the sensor arrays. It is noted that the terms earth and ground are often used interchangeably herein. Because of the physical offset of the first and second sensor arrays, at a common time T0, the first and second sensor arrays image different parts of the ground. In other words, at the time T0 the first and second sensor arrays (e.g., 304, 306, respectively) capture the portions of the images 514, 516, respectively, which correspond to different parts of the ground. Nevertheless, the first and second sensor arrays are sufficiently close to one another and are moving at the same time as one another relative to the ground such that a majority of the first and second images will correspond to the same portion of the ground, just captured at slightly different times with slightly different satellite viewing angles. For example, at a time T1 the first sensor array (e.g., 304) images the piece of ground P (labeled 518), which same piece of ground P (labeled 518) that is imaged by the second sensor array (e.g., 306) at a time T2, where T1<T2 (i.e., T2 occurs after T1). This concept if further explained with reference to FIG. 5B. In FIG. 5B, the piece of ground P (labeled 518) is shown as being part of a larger geographic region 520 for which the first sensor array (e.g., 304) is used to obtain the first image 504, and for which the second sensor array (e.g., 306) is used to obtain the second image 506. Associated with each of the first and second images 504, 506 is respective image data. More specifically, associated with the first image 504 is first image data that includes first image information about the geographic region 520, and associated with the second image 506 is second image data that includes second image information about the geographic region 520. For example, the first image information about the geographic region 520 (which is included in the first image data) can include B, G, R, and N1 band values for each pixel of N×M pixels included in the first image 504, and the second image information about the geographic region 520 (which is included in second image data) can include C, Y, RE, and N2 band values for each pixel of N×M pixels included in the second image 506.

FIG. 5B shows the satellite 100 (T1), which is the satellite 100 at the time T1, and the satellite 100 (T2), which is the satellite 100 at the time T2. The dashed line labeled 514 (T1) is used to show which portion of the ground the first sensor array (e.g., 304) of the satellite is imaging at the time T1, and the dotted line labeled 516 (T1) is used to show which portion of the ground the second sensor array (e.g., 306) of the satellite is imaging at the time T1. Notice that at the time T1, the first sensor array (e.g., 304) is imaging the piece of ground P (labeled 518), and that it is not until the time T2 (where T1<T2) that the second sensor array (e.g., 306) is imaging the piece of the ground P (labeled 518). Certain embodiments of the present technology take advantage of this arrangement to detect clouds, as will now be described with reference to FIG. 5C.

FIG. 5C is similar to FIG. 5B, except FIG. 5C also shows a cloud 530 between the satellite 100 and the ground at the time T2. In FIG. 5C, at the time T1, the first sensor array (e.g., 304) on the satellite 100 images the piece of the ground P (labeled 518) without the cloud 530, i.e., cloud-free, as represented by the dashed line labeled 514 (T1). However, at the time T2, the second sensor array (e.g., 306) on the satellite 100 images the same piece of ground P (labeled 518) while the cloud 530 is at least partially obscuring what the second sensor array (e.g., 306) sees. In other words, at the time T2 the image of the piece of ground P (labeled 518) that is captured by the second sensor array (e.g., 306) will include the cloud 530, which will likely obscure features on the ground. Certain embodiments of the present technology take advantage the fact that a cloud horizontally near a piece of ground (e.g., the piece of ground P, labeled 518) will typically not appear at the same location on the ground in first and second images of that piece of ground that are captured, respectively, by first and second image sensors (e.g., 304 and 306) that are physically offset from one another. There are two reasons why this is the case, i.e., why a cloud horizontally near a piece of ground will not typically appear at the same location on the ground in first and second images of that piece of ground that are captured, respectively, by first and second image sensors that are physically offset from one another. One reason relates to parallax, and more specifically, that the satellite viewing angle relative to the piece of ground P changes between the time T1 and the time T2, assuming the difference between the times T1 and T2 is large enough relative to a resolution of the sensor arrays. Another reason is that the cloud 530 will likely move relative to the ground between the time T1 and the time T2, assuming the difference between the times T1 and T2 is large enough relative to the resolution of the sensor arrays. FIGS. 5A, 5B, and 5C may be referred to collectively hereinafter as FIG. 5.

Figure 6:
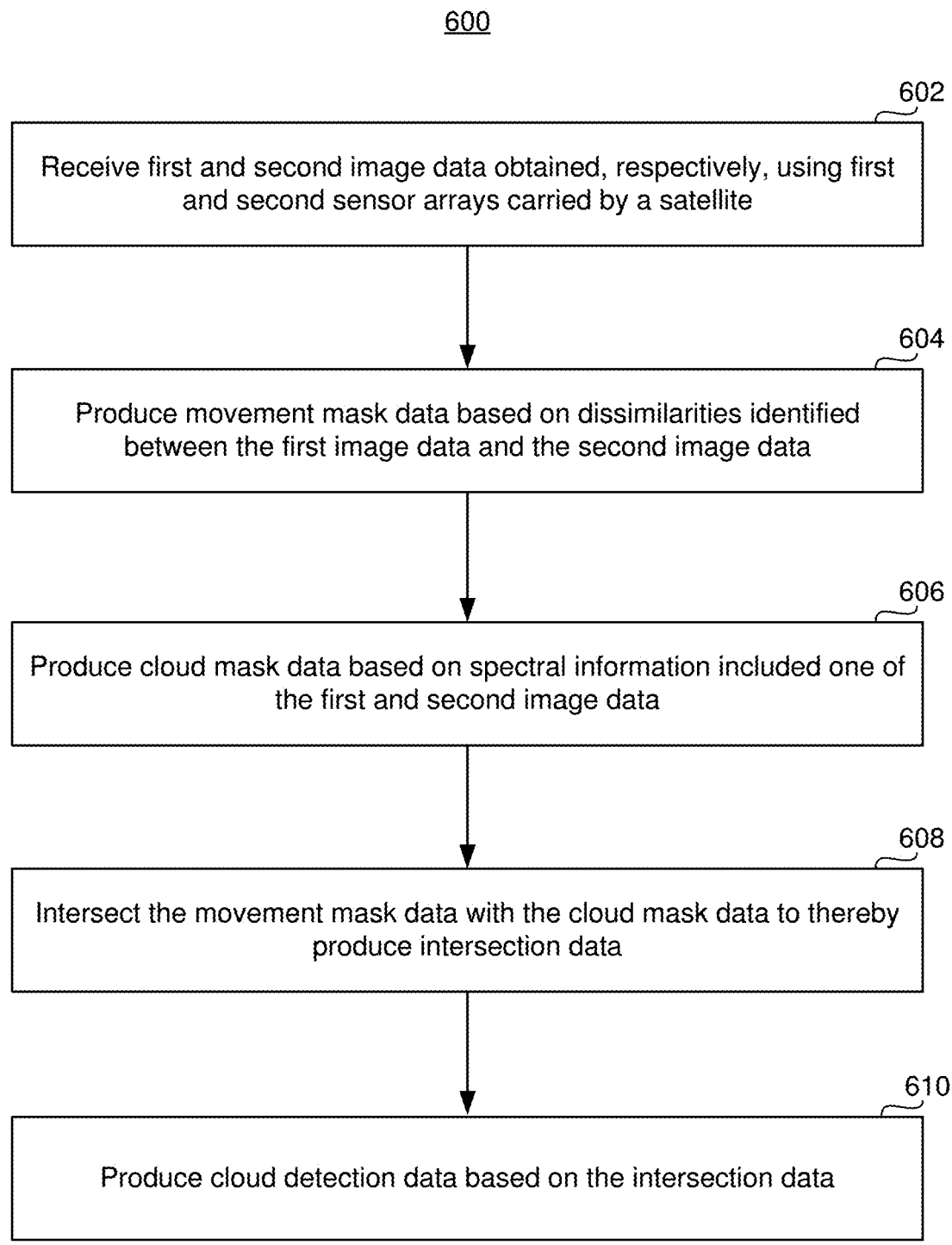
FIG. 6 is a high level flow diagram that is used to describe methods, according to certain embodiments of the present technology, for detecting clouds in satellite imagery captured using first and second sensor arrays that are carried by a satellite and physically offset from one another on the satellite.

The high level diagram of FIG. 6 will now be used to describe a method 600, according to certain embodiments of the present technology, for detecting clouds in satellite imagery captured using first and second sensor arrays (e.g., MS1 and MS2 sensor arrays) that are carried by a satellite (e.g., 100) and physically offset from one another on the satellite. FIGS. 7-10 will thereafter be used to describe additional details of the steps of the method originally described with reference to FIG. 6. The method described with reference to FIGS. 6-10, and more specifically the steps thereof, can be performed, for example, by a data center (e.g., 232), an end user (e.g., 242), or a combination thereof, but is not limited thereto. Even more specifically, the cloud detection techniques described herein can be performed by the image processing system 236 of the data center 232, wherein the image processing system 236 can be or include a computer system that includes one or more processors, one or more displays, memory, one or more user interfaces, and/or the like.

Referring to FIG. 6, step 602 involves receiving first and second image data obtained, respectively, using the first and second sensor arrays (such as the MS1 and MS2 sensor arrays, e.g., 304 and 306 in FIG. 4) carried by a satellite (e.g., 100). The first image data include first image information about a geographic region (e.g., the geographic region 520 in FIG. 5), and the second image data includes second image information about the same geographic region (e.g., the geographic region 520 in FIGS. 5B and 5C). As can be appreciated from the above discussion of FIGS. 3 and 5, because of the physical offset between the first and second sensor arrays, the first image information about the geographic region (included in the first image data) will differ from the second image information about the same geographic region (included in the second image data). The first image information can include inter alia first spectral information obtained from image sensors of the first sensor array, and the second image information can include inter alia second spectral information obtained from image sensor of the second sensor array. The first and second image data obtained at step 602 can be preprocessed, including trimmed as desired, calibrated, normalized, filtered, and/or the like, such that the first and second image data includes the content desired to perform the techniques described herein.

Still referring to FIG. 6, step 604 involves producing movement mask data based on dissimilarities identified between the first image data and the second image data. Such movement mask data indicates where it is likely that the dissimilarities between the first image data and the second image are due to movement of one or more objects within the first geographic region. While the objects that are identified as having moved may include clouds, the objects that are identified as having moved can also include other types of objects besides clouds, such as, but not limited to, vehicles (e.g., cars, trucks, airplanes), and ocean waves. It would also be possible that one or more specular reflections that appear at different locations in the first and second images may be included in the movement mask data. Data corresponding to vehicles, ocean waves, specular reflections, and other types of non-cloud objects included in the movement mask data are examples of false positives. Accordingly, as can be appreciated from the above discussion of step 604, using movement mask data by itself to detect clouds would almost certainly result in numerous false positives, and thus, would not on its own provide for accurate cloud detection. Additional details of step 604, according to certain embodiments of the present technology, are described further below with reference to FIG. 7.

Still referring to FIG. 6, step 606 involves producing cloud mask data based on spectral information included in one of the first and second image data. Such cloud mask data indicates where it is likely (based on the spectral information included in one of the first and second image data) that one or more clouds are represented within one of the first and second image data. For the sake of discussion, it is assumed that it is the first image data that is used to produce the cloud mask data at step 604. The spectral information included in the first image data can include, for example, B, G, R, and N1 band values for each pixel of N×M pixels included in the first image (e.g., 504 in FIG. 5A). As will be discussed in further detail below with reference to FIG. 8, in accordance with certain embodiments, step 606 can involve producing a cloud index value for each of a plurality of pixels (each of the N×M pixels included in the first image, or a subset thereof) based on R, G, and B band values (also referred to as RGB data) corresponding to those pixels, and thresholding the cloud index values.

Still referring to FIG. 6, step 608 involves intersecting the movement mask data with the cloud mask data to produce intersection data, and step 610 involves producing cloud detection data based on the intersection data produced at step 608. The resulting cloud detection data will indicate where it is likely, based on the dissimilarities between the first image data and the second image data, as well as based on the spectral information included in one of the first and second image data, that one or more clouds are represented within one of the first and second image data. More specifically, the intersection data that is produced by intersecting the movement mask data with the cloud mask data will specify where there is an indication in both the movement mask data and the cloud mask data that a cloud may be present. Accordingly, it could be appreciated how an intersection function is similar to a logical AND function. The term likely, as used herein, refers to there being at least a specified probability (which is greater than at least 50%) that something is true.

As noted above, embodiments of the present technology take advantage of the fact that there is a physical offset between the first and second sensor arrays that are used to obtain the first and second image data respectively. More specifically, because the first sensor array used to obtain the first image data is physically offset on the satellite from the second sensor array used to obtain the second image data, a second satellite viewing angle associated with the second image data obtained using the second sensor array differs from a first satellite viewing angle associated with the first image data obtained using the first sensor array, with a difference between the first and second satellite viewing angles being a parallax angle. Further, because the first sensor array used to obtain the first image data is physically offset on the satellite from the second sensor array used to obtain the second image data, a second time (e.g., T2) at which part of the second image data corresponding to a piece (e.g., 518 in FIG. 5) of the geographic region (e.g., 520 in FIG. 5) is obtained using the second sensor array differs from a first time (e.g., T1) at which part of the first image data corresponding to the same piece (e.g., 518 in FIG. 5) of the geographic region (e.g., 520 in FIG. 5) is obtained using the first sensor array, with a difference between the first and second times being a temporal offset (i.e., temporal offset=T2-T1).

In accordance with certain embodiments, the first image data obtained using the first sensor array (which is received at step 602) includes first spectral band data corresponding to a first spectral band, and the second image data obtained using the second sensor array (which is received at step 602) includes second spectral band data corresponding to a second spectral band that is adjacent to and thereby proximate in wavelength to the first spectral band. This way the second image data and the first image data, while different due to parallax and temporal offset, will have spectral information from similar spectral bands, such that they can be compared to another to identify differences that are likely due to movement, not due to the spectral information being significantly different. As an example, first spectral band data (included in the first image data) can be the blue (B) band (450-510 nm), and second spectral band (included in the second image data) can be the coastal (C) band (400-450 nm), which is adjacent to the blue (B) band. For another example, first spectral band data (included in the first image data) can be the red (R) band (630-690 nm), and second spectral band (included in the second image data) can be the red edge (RE) band (705-745 nm), which is adjacent to the red (R) band. These are just a few examples, which are not intended all inclusive, of the different bands of data that can be compared to one another to produce the movement mask data.

Figure 7:
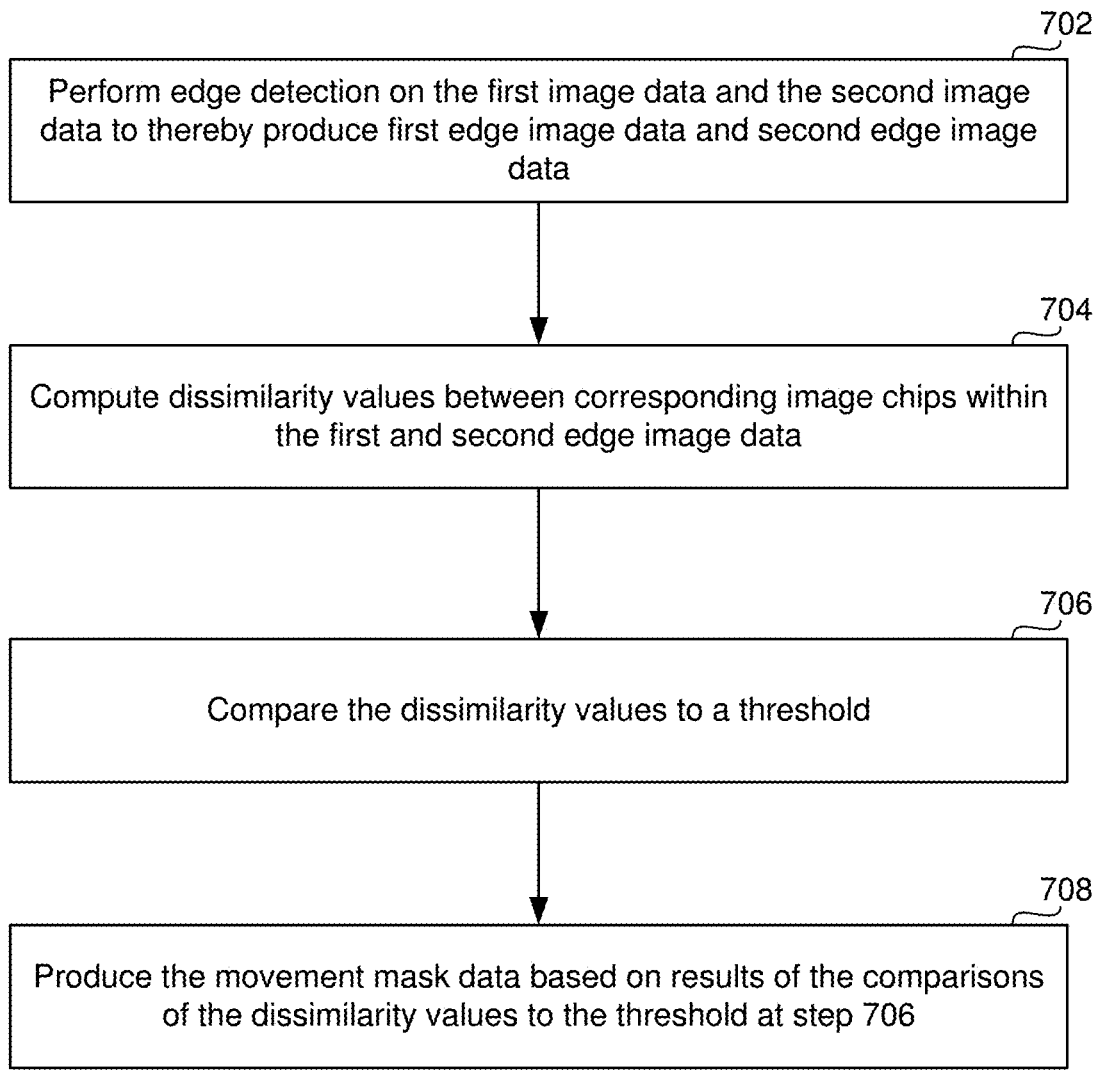
FIGS. 7-9 are flow diagrams that are used to describe, in further detail, how various steps introduced with reference to FIG. 6 can be implemented, in accordance with certain embodiments of the present technology.

Additional details of how the movement mask data can be produced at step 604, according to certain embodiments of the present technology, will now be described with reference to FIG. 7. Referring to FIG. 7, step 702 involves performing edge detection on the first image data to thereby produce first edge image data, and performing edge detection on the second image data to thereby produce second edge image data. The edge detection performed at step 702 can be performed using an edge detection algorithm, such as, but not limited to, a difference of Gaussians algorithm, a Canny edge detection algorithm, a Haralick-Canny edge detection algorithm, a Sobel edge detection algorithm, a Prewitt edge detection algorithm, or a Roberts edge detection algorithm, just to name a few.

Still referring to FIG. 7, step 704 involves computing dissimilarity values between corresponding image chips (of the same size) within the first and second edge image data. Assume, for example, that the first and second edge image data each includes data for a matrix of 1024×2048 pixels, and that each of the image chips include data for 16×16 pixels. Dissimilarity values can be computed, for example, by first computing similarity values for corresponding image chips within the first and second image data. Such similarity values can be in the range of −1 to +1, where the maximum value of 1 corresponding to being most similar (i.e., identical), and the minimum value of −1 corresponds to being least similar (i.e., totally opposite, aka anti-correlated). The dissimilarity values can be computed by subtracting each of the similarities values from 1 to produce the dissimilarity values, where the maximum value of 2 corresponds to being most dissimilar (i.e., totally opposite, aka anti-correlated), and the minimum value of 0 corresponds to being the least dissimilar (i.e., identical). For example, if a similarity value is −1, and that similarity value is subtracted from 1, then the dissimilarity value will be −2 (because 1 (−1)=1+1=2). For another example, if a similarity value is +1, the that similarity value is subtracted from 1, then the dissimilarity value will be 0 (because 1−1=0). Accordingly, the maximum dissimilarity value would theoretically be 2, and the minimum dissimilarity value would theoretically be 0. In actual practice, the maximum dissimilarity value is typically less than 2, e.g., about a value of 1.3, but not limited thereto. Further, in actual practice, the minimum dissimilarity value is typically greater than 0. Continuing with the above example where the first and second edge image data each includes data for a matrix of 1024×2048 pixels, and where each of the image chips is 16×16 pixels, then 8,192 dissimilarity values would be computed in certain embodiments (i.e., within a matrix of 1024×2048 pixels, there are 64×128 chips that are each 16×16 pixels in size, for a total of 8,192 chips, with a dissimilarity value computed for each chip). Image chips are sometimes referred to by other names, such as image tiles, or image patches, but not limited thereto.

Still referring to FIG. 7, step 706 involves comparing the dissimilarity values to a threshold, and step 708 involves producing the movement mask data based on results of the comparing the dissimilarity values to the threshold at step 706. More specifically, in certain embodiments, if a dissimilarity value corresponding to an image chip is above the threshold, then the portion of the cloud mask data representing that image chip is classified as likely corresponding to a cloud. Conversely, if a dissimilarity value corresponding to an image chip is below the threshold, then the portion of the cloud mask data representing that image chip is classified as likely not corresponding to a cloud. The threshold used at step 706 can be a predetermined value that is determined based on training data, or the like. Alternatively, the threshold used at step 706 can be specifically determined based on the first and second image data, and/or the first and second edge image data. For example, the threshold used at step 706 can be varied iteratively until a resultant number of pixels classified as likely corresponding to a cloud meet some specified criteria. Other variations are also possible and within the scope of the embodiments described herein.

Additional details of how the cloud mask data is produced at step 606, according to certain embodiments of the present technology, will now be described with reference to FIG. 8. Such embodiments take advantage of the facts that clouds tend to be grey to white, and thus have low chroma and high lightness.

Figure 8:
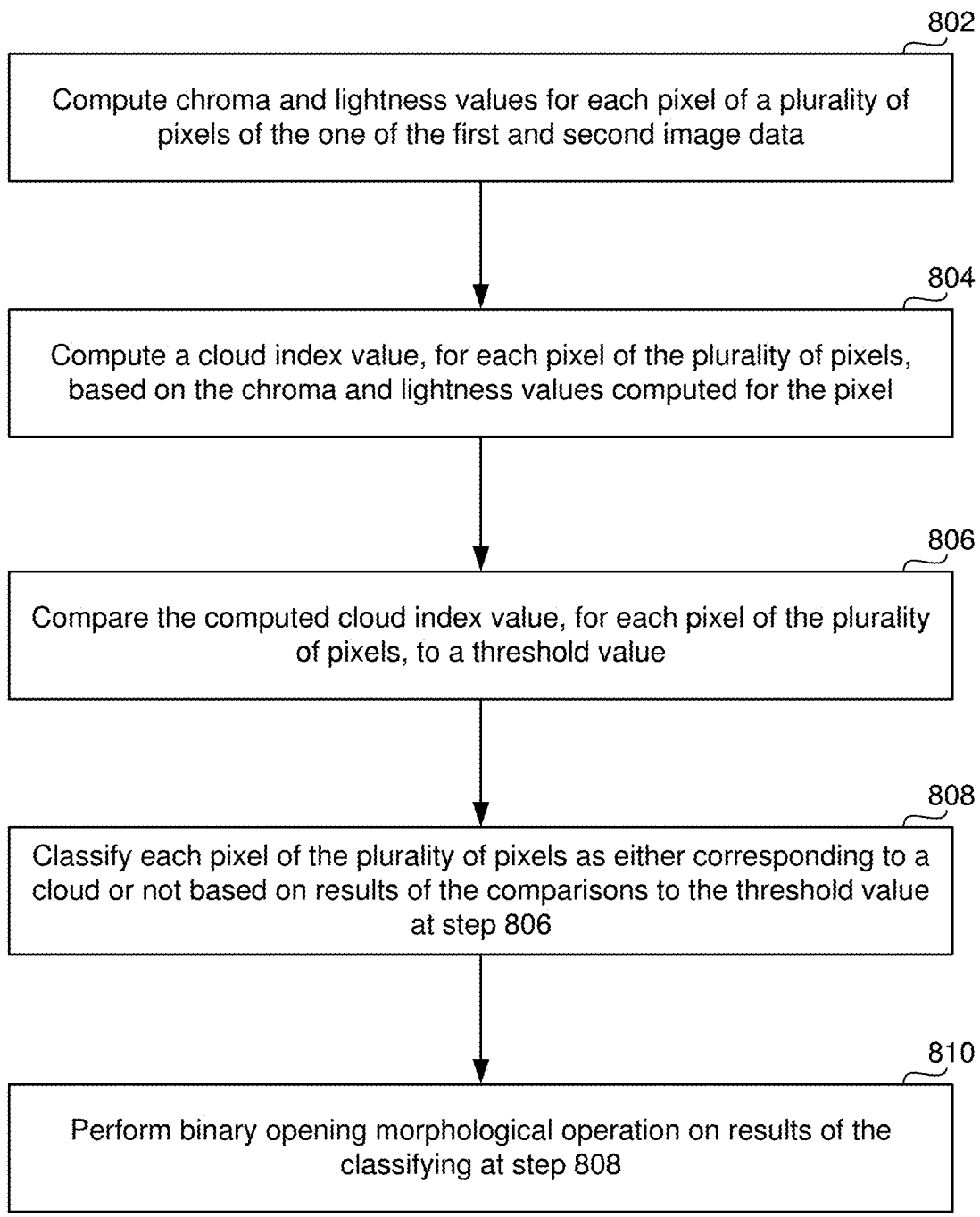

Referring to FIG. 8, step 802 involves computing chroma (C) and lightness (L) values for each pixel of a plurality of pixels of one of the first and second image data, which was received at step 602. For the sake of an example, assume that the first image data includes at least R, G, and B band data, and that chroma and lightness values are determined for each pixel represented within the first image data based on the R, G, and B band data. In accordance with certain embodiments, chroma (C) is calculated using the equation C=M−m, where M=max(R,G,B) and m=min(R,G,B). More specifically, a maximum (M) of the R, G, and B band values is determined, and a minimum (m) of the R, G, and B band values is determined, and then the minimum (m) is subtracted from the maximum (M) to calculate the chroma (C). In accordance with certain embodiments, lightness (L) is calculated using the equation L=avg(R,G,B). More specifically, the lightness (L) can be calculated by summing the R, G, and B band values and then dividing the resulting sum by three. Alternative spectral band data besides R, G, and B band data can be used to calculate chroma and lightness values. It is also possible that chroma and lightness be determined based on more than three bands of data (e.g., based on four or more bands of data), or potentially as few as two bands of data. In general, clouds tend to have low chroma, and high lightness, as noted above.

Still referring to FIG. 8, step 804 involves computing a cloud index value, for each pixel of the pixels for which the chroma and lightness were calculated, wherein the cloud index value computed for each pixel is computed based on the chroma and lightness values computed for the pixel. In certain embodiments, the cloud index value is computed using the equation:

$$\text{index} = \frac{L}{aC^2 + b}$$

where
index is the cloud index value for the pixel,
L is the lightness value calculated for the pixel,
C is the chroma value calculated for the pixel, and
a and b are constants.

In accordance with certain embodiments, values for the constants a and b in the above discussed equation are chosen to best separate clouds from non-clouds. Still referring to FIG. 8, step 806 involves comparing the computed cloud index value, for each pixel of the plurality of pixels, to a threshold value, and step 808 involves classifying each pixel of the plurality of pixels as either corresponding to a cloud or not based on results of the comparisons to the threshold value. For example, pixels having a cloud index value greater than the threshold value can be classified as corresponding to a cloud, and pixels having a cloud index that is not greater than the threshold value can be classified as not corresponding to a cloud. If the cloud index values were computed in a different manner, then the steps 806 and/or 808 may differ. For example, if numerator and the denominator in the above shown cloud index equation were swapped, then at step 808, pixels having a cloud index value less than the threshold value can be classified as likely corresponding to a cloud, and pixels having a cloud index that is not less than the threshold value can be classified as likely not corresponding to a cloud.

The results of the classifying at step 808 can be used to produce the cloud mask data, with the cloud mask data specifying for each pixel (e.g., within image data for N×M pixels) whether the pixel is classified as likely corresponding to a cloud or not. In specific embodiments, an additional step is performed, which is step 810 in FIG. 8, which involves performing a binary opening morphological operation on results of the classifying at step 808, to thereby reduce a number of false positives included in the cloud mask data before the cloud mask data is intersected with the movement mask data (at step 608).

Other variations are also possible and within the scope of the embodiments described herein. For example, alternative equations can be used to calculate the cloud index values. Further, different types of color transformations can be used besides transformations from RBG color space data to chroma and lightness values. For example, starting with the RGB color space data, transformations can be to color spaces other than HSL (hue, saturation, lightness) color space, such as to the HCL (hue, chroma, luminance) color space, or the HSV (hue, saturation, value) color space, but is not limited thereto. Additionally, the starting color space need not be the RBG color space.

Figure 9:
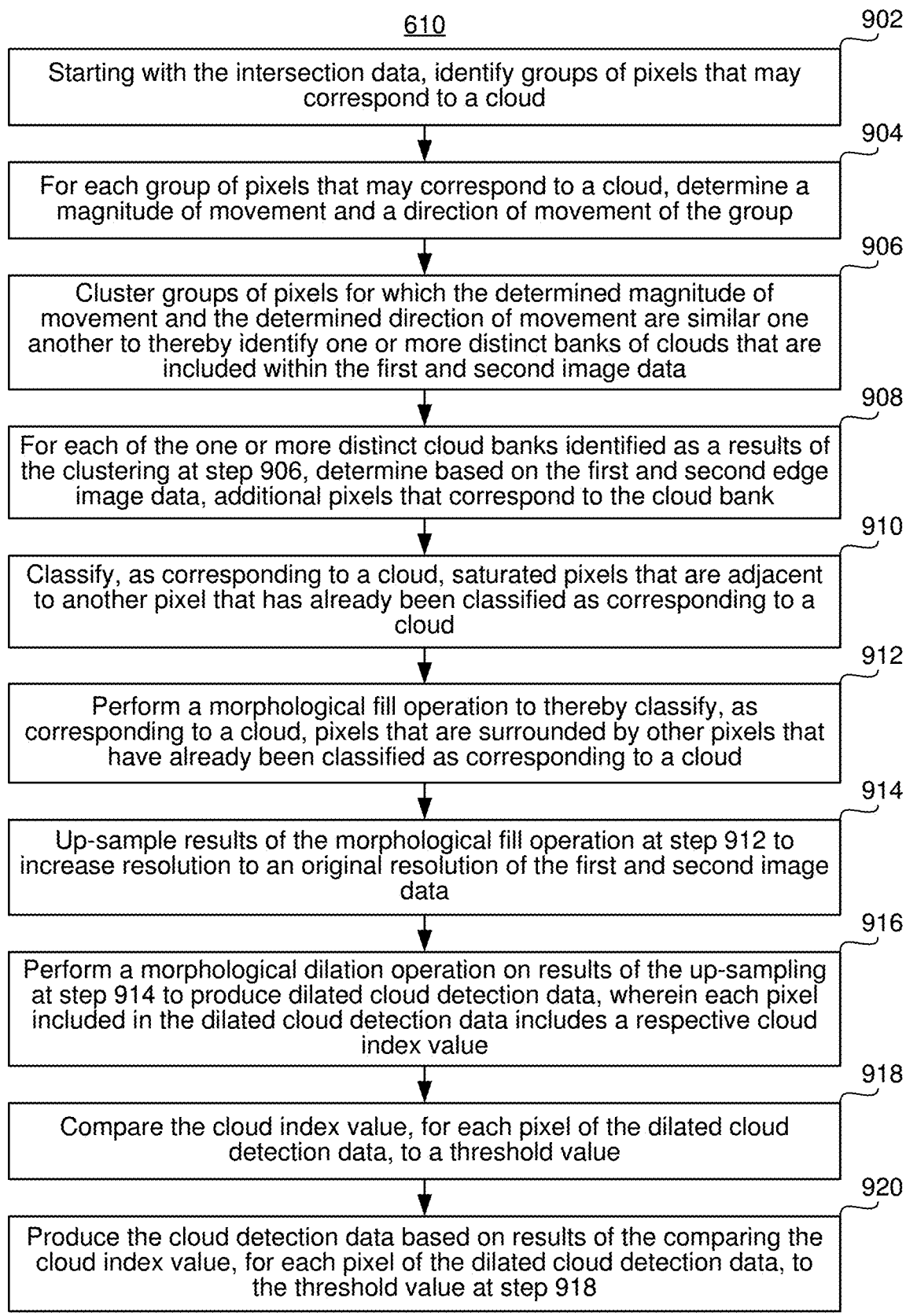

Additional details of how the cloud detection data is produced at step 610, according to certain embodiments of the present technology, will now be described with reference to FIG. 9. Referring to FIG. 9, step 902 involves, starting with the intersection data (results of the intersecting performed at step 608), identifying one or more groups of pixels that may correspond to a cloud. As noted above, the results of intersecting the movement mask data with the cloud mask data will specify where there is an indication in both the movement mask data and the cloud mask data that a cloud likely is present. Clouds will likely have at least some minimum size which is much larger than the size of moving vehicles and various other moving objects that could potentially be represented in the results of intersecting the movement mask data with the cloud mask data.

Accordingly, step 902 may be performed by identifying groups of pixels (within the results of intersecting) that are within a specified distance of one another and exceed a specified minimum number of pixels. Other variations are also possible, and within the scope of the embodiments described herein. The results of step 902 will be one or more groups of pixels that may correspond to a cloud.

Still referring to FIG. 9, at step 904, for each group of pixels that may correspond to a cloud (identified at step 902), there is a determination of a direction of movement and a magnitude of movement of the group. For example, a group of pixels that may correspond to a cloud in one of the first and second images can be moved around relative to the other one of the first and second images to identify where there is the best match or correlation, so as to identify where that group of pixels is in each of the first and second images. Once the best match is found, the determined direction of movement can be represented by x and y values, where the x value corresponds to movement in a horizontal direction, and the y value corresponds to movement in a vertical direction. In other words, the x and y values represent an offset, i.e., how much a group of pixels that may correspond to a cloud moved during the temporal offset associated with the first and second images. For a specific example, positive x values may correspond to movement to the east, negative x values may correspond to movement to the west, positive y values may correspond to movement to the north, and negative y values may correspond to movement to the south. Accordingly, if x=4 and y=4 those values can represent movement in a north-east direction; if x=5 and y=0 those values can represent movement to the east; or if x=0 and y=−5 those values can represent movement to the south. The magnitude of movement can be determined based on the x and y values, e.g., using the equation:

$$\text{Magnitude of movement}(m) = \sqrt{x^2 + y^2}.$$

In certain embodiments, the direction (d) of movement can be quantified as an angle that can also be determined based on the x and y values, e.g., by determining the arctangent (arctan) of the x value divided by the y value, but not limited thereto. Other variations are also possible and within the scope of the embodiments described herein.

Still referring to FIG. 9, step 906 involves clustering groups of pixels for which the determined magnitude of movement and the determined direction of movement are similar one another to thereby identify one or more distinct banks of clouds that are included within the first and second image data. The extent to which determined magnitudes of movement and the determined directions of movement must be sufficiently similar in order to be identified as corresponding to a same bank of clouds will depend on the specific implementation. For one example, where movement associated with a group of 900 pixels is generally in the same direction (e.g., eastward), with the magnitudes of movement associated with 800 (out of 900) of the pixels being generally the same (e.g., within 20% of one another), then those 800 pixels for which the associated movement is generally in the same direction with generally the same magnitude may be clustered. This can result in numerous groups of pixels being selectively clustered to produce a lower number of clusters of pixels (as compared to the number of groups of pixels identified prior to the clustering), wherein the pixels in a same cluster are believed to correspond to a same cloud bank.

Different types of cloud banks may be represented in the first and second image data, wherein the different types of cloud banks may move in different directions and at different speeds. The term cloud bank, as used herein, refers to one or more clouds of the same type that should move in generally the same direction at generally the same speed. Cumulus, Stratus, and Stratocumulus clouds are types of low-level clouds that are typically present below 6,500 feet (i.e., below ~2,000 meters). Altocumulus, Nimbostratus, and Altostratus clouds are types of mid-level clouds that are typically present between 6,500 and 20,000 feet (i.e., between ~2,000 and 6,000 meters). Cirrus, Cirrocumulus, and Cirrostratus clouds are types of high-level clouds that are typically present above 20,000 feet (i.e., above ~6,000 meters). Cumulonimbus clouds can be present from near the ground to above 50,000 feet, and thus, can be present across the low, middle, and upper atmosphere.

Still referring to FIG. 9, step 908 involves (for each of the one or more distinct cloud banks identified as a result of the clustering at step 906), determining based on the first and second edge image data (produced at sub-step 702 of step 604), additional pixels that correspond to the cloud bank. For example, at step 908, for each cloud type there is a determination whether there are additional pixels detectable from the first and second image data that have a similar offset (i.e., direction and magnitude of movement), similar chroma, and similar lightness (or some other measure of or related to brightness). For example, in order to determine whether additional pixels have a similar chroma to pixels already found to correspond to a specific cloud bank, a range of chroma values can be defined based on those pixels already found to correspond to the specific cloud bank. A range of lightness values can also be specified in a similar manner. In order to determine whether additional pixels have a similar offset to pixels already found to correspond to a specific cloud bank, a range of offsets can be defined based on those pixels already found to correspond to the specific cloud bank. Here the offset range can be set relatively small where the offsets of pixels already found to correspond to the specific cloud bank are relatively small (which will occur where the cloud bank moves slow), or the offset range can be larger where the offsets of pixels already found to correspond to the specific cloud bank are relatively large (which will occur where the cloud bank moves fast). Other variations are also possible and within the scope of the embodiments described herein. Where such additional pixels are detected, they are added to/included in the cloud detection data as likely corresponding to a cloud bank.

As noted above, clouds tend to be grey to white, and thus have a low chroma and high lightness. Because clouds tend to have a high lightness, it is quite common for pixels corresponding to clouds to be saturated, wherein saturated pixels are those for which a particular spectral value (e.g., a blue value) is at or near (e.g., within 10% of) a maximum value, and is analogous to an overexposed portion of an image. Step 910 takes this into account. More specifically, step 910 involves classifying, as corresponding to a cloud, saturated pixels (not yet classified as corresponding to a cloud) that are adjacent to another pixel that has already been classified as corresponding to a cloud. For example, if a group of 800 pixels have been classified as corresponding to a cloud, saturated pixels that are adjacent to one or more of those 800 pixels (already classified as corresponding to a cloud) will also be classified as corresponding to a cloud.

Step 912 involves performing a morphological fill operation to thereby classify, as corresponding to a cloud, pixels that are surrounded by other pixels that have already been classified as corresponding to a cloud. This step is used to remove false negatives, i.e., to identify pixels that likely correspond to a cloud which were previously not identified as likely corresponding to a cloud.

Step 914 involves up-sampling results of the morphological fill operation (at step 912) to increase resolution of the data to an original resolution of first and second image data. For an example, which is not intended to be limiting, up-sampling may occur to increase resolution from 64×128 pixels to 1024×2048 pixels.

Step 916 involves performing a morphological dilation operation on results of the up-sampling (at step 914) to thereby produce dilated cloud detection data. In certain embodiments, each pixel included in the dilated cloud detection data includes a respective cloud index value.

Step 918 involves comparing the cloud index value, for each pixel of the dilated cloud detection data, to a threshold value.

Step 920 involves producing the cloud detection data based on results of the comparing (at step 918) the cloud index value, for each pixel of the dilated cloud detection data, to the threshold value. For example, the cloud detection data may indicate that each pixel having a corresponding cloud index value that is greater than the threshold corresponds to a cloud, with the remaining pixels (not having a corresponding cloud index value that is greater than the threshold) not corresponding to a cloud.

The flow diagram of FIG. 9 is used to describe just certain techniques for producing cloud detection data (at step 610 in FIG. 6) based on results of the intersecting that was performed at step 608 (in FIG. 6). More or less complex and/or alternative techniques for producing cloud detection data (at step 610 in FIG. 6) based on results of the intersecting that was performed at step 608 (in FIG. 6) are also within the scope of the embodiments described herein. For an example, in a simpler embodiment, the cloud detection data produced at step 610 can simply be the results of the intersecting performed at step 608. In another embodiments, step 610 can include performing just a subset of the steps 904-920 described above with reference to FIG. 9. Alternative and/or additional implementation details are also possible, and within the scope of the embodiments described herein.

Certain embodiments of the present technology described herein provide for improved cloud detection from satellite imagery by taking advantage of clouds being imaged using sensor arrays that are physically offset from one another, which enables cloud movement to be detected from images obtained using the physically offset sensor arrays. Certain embodiments of the present technology take advantage of the fact that clouds of the same type typically have coordinated movement in a small number of directions. In other words, such embodiments take advantage of the fact that clouds of the same type generally move in the same direction at generally the same speed. Further, certain embodiments of the present utilize a color space transformation and an associated cloud index, which are good at eliminating many false positives as well as identifying cloud edges. Beneficially, by taking advantage of the fact that clouds typically move over time, embodiments of the present technology can be used to distinguish clouds from snow and ice, bright building rooftops, and bright desert and other geologic features that frequently caused false positives in previously known cloud detection algorithms. This is at least in part because snow and ice, bright building rooftops, and bright desert and other geologic features should have no apparent motion, so they are readily distinguishable from clouds using techniques described herein.

Figure 10:
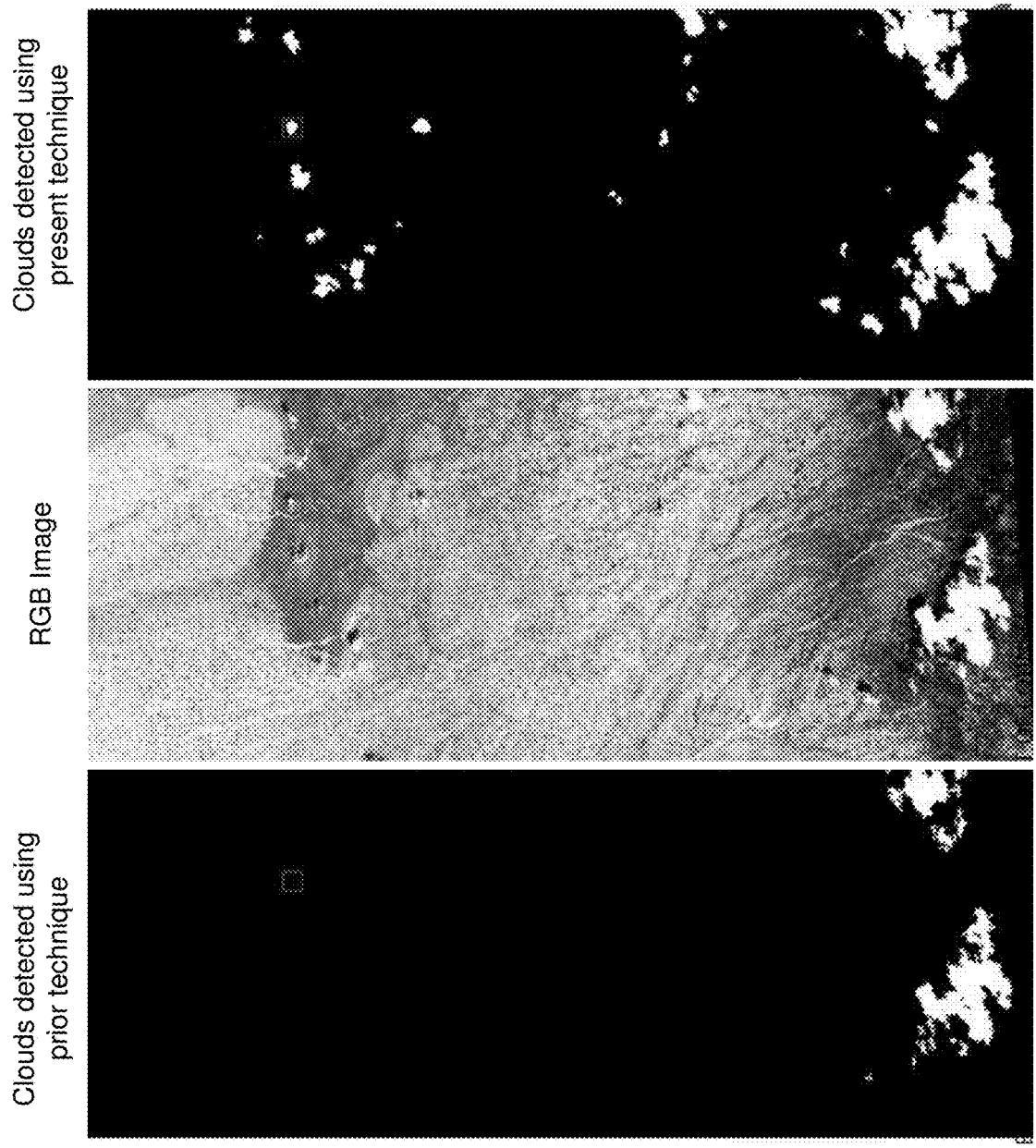
FIGS. 10-12 are used to show how the embodiments of the present technology can be used to detect clouds with increased accuracy compared to previous (aka prior) cloud detection techniques.
Figure 11:
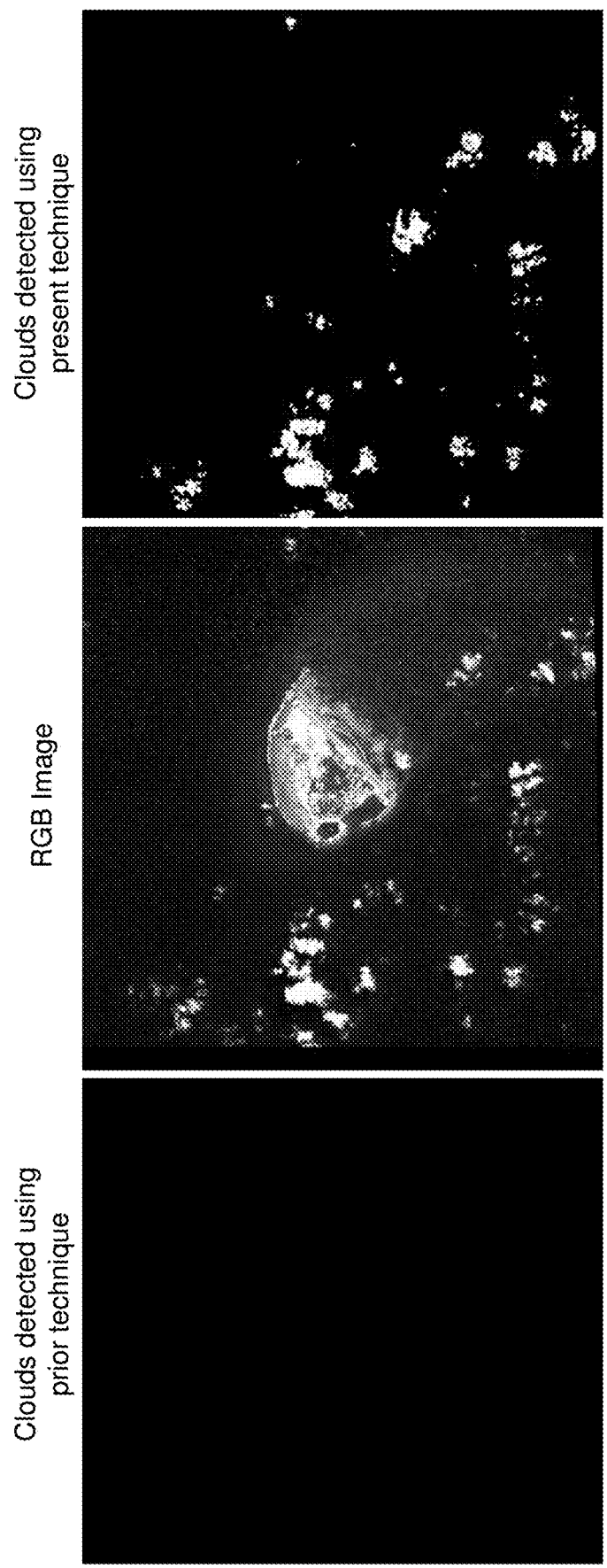
Figure 12:
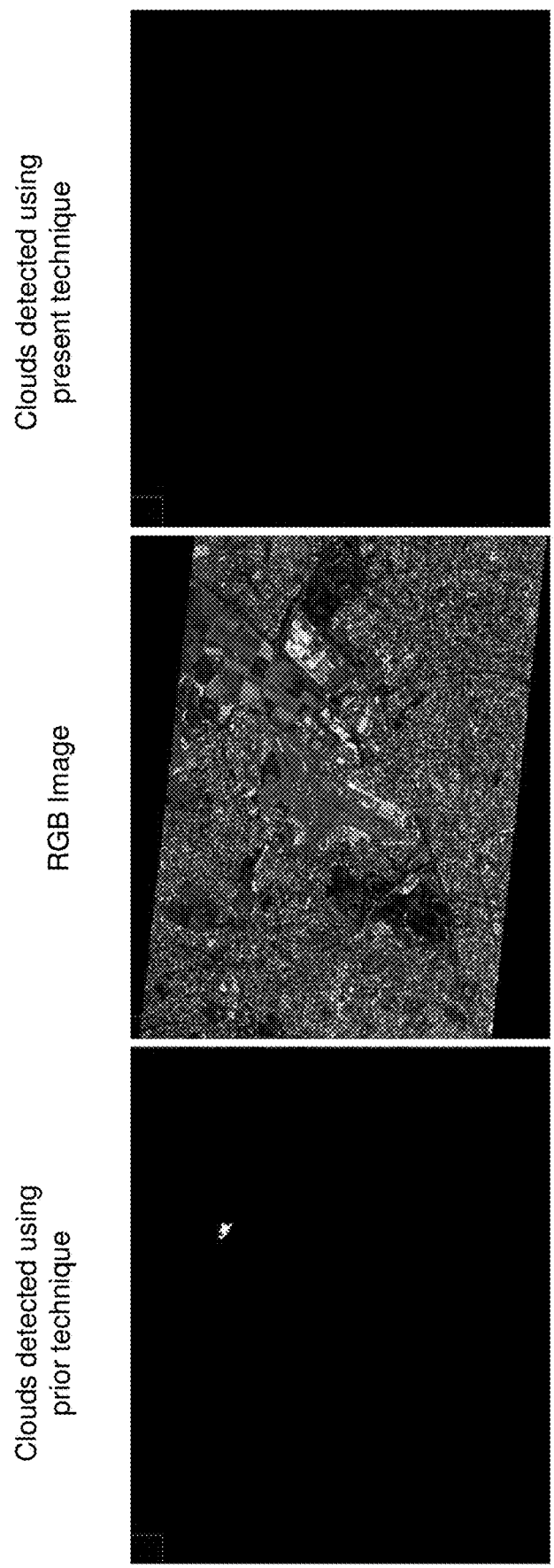

FIGS. 10-12, described below, show how the embodiments of the present technology described above can be used to detect clouds with significantly increased accuracy compared to previous cloud detection techniques. In each of FIGS. 10-12, the image shown in the middle corresponds to an RBG image obtained using a first sensor array (e.g., the MS1 sensor array), the binary image shown at the left corresponds to clouds detected using a prior art cloud detection algorithm, and the binary image shown at the right corresponds to clouds detected using embodiments of the present technology described above with reference to the flow diagrams of FIGS. 6-9. In the binary images shown at the left and right in each of FIGS. 10-12, white pixels represent detected clouds, and black pixels represent cloud-free regions. To produce the binary images shown at the right, using embodiments of the present technology, first and second images of the geographic region (represented in the middle RGB image) were obtained using first and second sensor arrays physically offset from one another, e.g., as was described above with reference to FIGS. 3-5.

Referring to FIG. 10, the RGB image shown in the middle is of a landmass that includes a bright desert, which caused a prior technique to fail to identify the clouds included in the upper and middle portions of the image, which were identified using the embodiments of the present technology described herein. In other words, a comparison of the left and right binary images shown in FIG. 10 show how the prior cloud detection technique failed to detect many of the clouds that were successfully detected using embodiments of the present technology.

Referring to FIG. 11, the RGB image shown in the middle is of an island surrounded by a large body of water, wherein many of the clouds included in the RGB image are thin clouds over the water. As can be appreciated from the binary image shown at the left in FIG. 11, the prior technique failed to detect any of the thin clouds. By contrast, as can be appreciated by the binary image shown at the right in FIG. 11, embodiments of the present technology described herein were able to detect almost all of the thin clouds.

Referring to FIG. 12, the RGB image shown in the middle is of a heavily developed swath of land that includes a few dirt fields near the upper right of the image, but which image is completely cloud-free. As can be appreciated from the binary image shown at the left in FIG. 12, the prior technique produced a false positive by detecting one of the dirt fields as a cloud. By contrast, as can be appreciated by the binary image shown at the right in FIG. 12, embodiments of the present technology described herein did not produce any false positives from the cloud-free imagery.

As noted above, at any given time, a significant portion of the surface of the Earth is obstructed from imaging by a satellite due to the presence of clouds. Embodiments of the present technology described herein can be used to accurately detect clouds so that such clouds can be masked out of images (e.g., RGB images) if desired. For example, such embodiments can be used to mask out clouds from images where image alignment (aka registration) requires stationary land pixels. For another example, embodiments described herein can be used to identify and select cloud-free portions of images that can then be stitched together to produce large cloud-free mosaics. For still another example, embodiments of the present technology can be used to improve the results of detection algorithms that are used to detect land development and/or deforestation from multiple different images of the same geographic region captured at different times, by enabling more accurate accounting for clouds. Embodiments of the present technology can also be used for weather related applications that monitor and/or predict weather. These are just a few examples of the types of applications with which cloud detection techniques described herein can be used, which examples are not meant to be all encompassing.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain of the subject matter described herein may be implemented on a computer system having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Certain embodiments of the present technology, described above, relate to a method for detecting clouds in satellite imagery captured using first and second sensor arrays that are carried by a satellite and physically offset from one another on the satellite. Such a method can include receiving first and second image data obtained, respectively, using the first and second sensor arrays carried by the satellite; producing movement mask data based on dissimilarities identified between the first image data and the second image data; producing cloud mask data based on spectral information included in one of the first and second image data; intersecting the movement mask data with the cloud mask data to thereby produce intersection data; and producing cloud detection data based on the intersection data.

In accordance with certain embodiments, the first image data includes first image information about a first geographic region; the second image data includes second image information about the first geographic region, which differs from the first image information about the first geographic region included in the first image data; the movement mask data indicates where it is likely that the dissimilarities between the first image data and the second image are due to movement of one or more objects within the first geographic region; the cloud mask data indicates where it is likely, based on the spectral information included in the one of the first and second image data, that one or more clouds are represented within the one of the first and second image data; and the cloud detection data indicating where it is likely, based on the dissimilarities between the first image data and the second image data, as well as based on the spectral information included in the one of the first and second image data, that one or more clouds are represented within the one of the first and second image data.

In accordance with certain embodiments, because the second sensor array used to obtain the first image data is physically offset on the satellite from the first sensor array used to obtain the second image data: a second satellite viewing angle associated with the second image data obtained using the second sensor array differs from a first satellite viewing angle associated with the first image data obtained using the first sensor array, with a difference between the first and second satellite viewing angles being a parallax angle; and a second time at which part of the second image data corresponding to a piece of the first geographic region is obtained using the second sensor array differs from a first time at which part of the first image data corresponding to the piece of the first geographic region is obtained using the first sensor array, with a difference between the first and second times being a temporal offset.

In accordance with certain embodiments, the first image data obtained using the first sensor array includes first spectral band data corresponding to a first spectral band, the second image data obtained using the second sensor array includes second spectral band data corresponding to a second spectral band that is adjacent to and thereby proximate in wavelength to the first spectral band, and the producing movement mask data comprises: performing edge detection on the first image data and the second image data to thereby produce first edge image data and second edge image data; computing dissimilarity values between corresponding image chips within the first and second edge image data; comparing the dissimilarity values to a threshold; and producing the movement mask data based on results of the comparing the dissimilarity values to the threshold.

In accordance with certain embodiments, the producing cloud mask data based on spectral information included in one of the first and second image data, comprises: computing chroma and lightness values for each pixel of a plurality of pixels of the one of the first and second image data; computing a cloud index value, for each pixel of the plurality of pixels, based on the chroma and lightness values computed for the pixel; comparing the computed cloud index value, for each pixel of the plurality of pixels, to a threshold value; and classifying each pixel of the plurality of pixels as either corresponding to a cloud or not based on results of the comparisons to the threshold value.

Additionally steps and details of such methods can be appreciated from the above description.

Certain embodiments of the present technology are directed to a non-transitory processor readable storage device having processor readable code embodied on the processor read storage device, the processor readable code for programming one or more processors to perform the method just described above.

Certain embodiments of the present technology are directed to a system for detecting clouds in satellite imagery captured using first and second sensor arrays that are carried by a satellite and physically offset from one another on the satellite, the system comprising one or more processors configured to: reduce movement mask data based first image data and the second image data, obtained, respectively, using the first and second sensor arrays carried by the satellite, the first image data including first image information about a first geographic region, and the second image data including second image information about the first geographic region, which differs from the first image information about the first geographic region included in the first image data. The one or more processors of the system or further configured to produce cloud mask data based on spectral information included in one of the first and second image data, the cloud mask data indicating where it is likely, based on the spectral information included in the one of the first and second image data, that one or more clouds are represented within the one of the first and second image data; and produce cloud detection data based on the movement mask data and the cloud mask data, the cloud detection data indicating where it is likely, based on both the movement mask data and the cloud mask data, that one or more clouds are represented within the one of the first and second image data. Additional details of such a system, which can include or be a computer system, can be appreciated from the above description.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For purposes of this document, a "computer" is a device for storing and/or processing data. A computer can include a desktop computer, a laptop computer, a server, a smartphone, a smart watch, a smart appliance, and any other machine that stores or processes data. Each computer can include one or more processors and memory. A computer can include a database and/or have access to a database.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method for detecting clouds in satellite imagery captured using first and second sensor arrays that are carried by a satellite and physically offset from one another on the satellite, the method comprising:

receiving first and second image data obtained, respectively, using the first and second sensor arrays carried by the satellite;

producing movement mask data based on dissimilarities identified between the first image data and the second image data;

producing cloud mask data based on spectral information included in one of the first and second image data;

intersecting the movement mask data with the cloud mask data to thereby produce intersection data; and producing cloud detection data based on the intersection data.

2. The method of claim 1, wherein:

the first image data includes first image information about a first geographic region;

the second image data includes second image information about the first geographic region, which differs from the first image information about the first geographic region included in the first image data;

the movement mask data indicates where it is likely that the dissimilarities between the first image data and the second image are due to movement of one or more objects within the first geographic region;

the cloud mask data indicates where it is likely, based on the spectral information included in the one of the first and second image data, that one or more clouds are represented within the one of the first and second image data; and the cloud detection data indicates where it is likely, based on the dissimilarities between the first image data and the second image data, as well as based on the spectral information included in the one of the first and second image data, that one or more clouds are represented within the one of the first and second image data.

3. The method of claim 1, wherein because the first sensor array used to obtain the second image data is physically offset on the satellite from the second sensor array used to obtain the second image data:

a second satellite viewing angle associated with the second image data obtained using the second sensor array differs from a first satellite viewing angle associated with the first image data obtained using the first sensor array, with a difference between the first and second satellite viewing angles being a parallax angle; and a second time at which part of the second image data corresponding to a piece of a first geographic region is obtained using the second sensor array differs from a first time at which part of the first image data corresponding to the piece of the first geographic region is obtained using the first sensor array, with a difference between the first and second times being a temporal offset.

4. The method of claim 1, wherein:

the first image data obtained using the first sensor array includes first spectral band data corresponding to a first spectral band, the second image data obtained using the second sensor array includes second spectral band data corresponding to a second spectral band that is adjacent to and thereby proximate in wavelength to the first spectral band, and the producing movement mask data comprises:

performing edge detection on the first spectral band data and the second spectral band data to thereby produce first edge image data and second edge image data;

computing dissimilarity values between corresponding image chips within the first and second edge image data;

comparing the dissimilarity values to a threshold; and producing the movement mask data based on results of the comparing the dissimilarity values to the threshold.

5. The method of claim 1, wherein the producing cloud mask data based on spectral information included in one of the first and second image data, comprises:

computing chroma and lightness values for each pixel of a plurality of pixels of the one of the first and second image data;

computing a cloud index value, for each pixel of the plurality of pixels, based on the chroma and lightness values computed for the pixel;

comparing the computed cloud index value, for each pixel of the plurality of pixels, to a threshold value; and classifying each pixel of the plurality of pixels as either corresponding to a cloud or not based on results of the comparisons to the threshold value.

6. The method of claim 5, wherein the computing the cloud index value, for each pixel of the plurality of pixels, is performing using the following equation:

$$\text{index} = \frac{L}{aC^2 + b}$$

where index is the cloud index value for the pixel,

L is the lightness value calculated for the pixel,

C is the chroma value calculated for the pixel, and a and b are constants.

7. The method of claim 5, wherein the producing cloud mask data further comprises, after the classifying each pixel of the plurality of pixels as either corresponding to a cloud or not:

performing a binary opening morphological operation on results of the classifying, to thereby reduce a number of false positives included in the cloud mask data before the cloud mask data is intersected with the movement mask data to produce the intersection data.

8. The method of claim 1, wherein the producing cloud detection data, based on the intersection data, comprises:

identifying, based on the intersection data, one or more groups of pixels that may correspond to a cloud;

for each group of pixels that may correspond to a cloud, determining a magnitude of movement and a direction of movement of the group; and clustering groups of pixels for which the determined magnitude of movement and the determined direction of movement are similar one another to thereby identify one or more distinct banks of clouds that are included within the first and second image data.

9. The method of claim 8, wherein, the producing the cloud detection data further comprises:

for each of the one or more distinct cloud banks identified as a result of the clustering, determining based on the first and second edge image data, additional pixels that correspond to the cloud bank;

classifying, as corresponding to a cloud, saturated pixels that are adjacent to another pixel that has already been classified as corresponding to a cloud;
performing a morphological fill operation to thereby classify, as corresponding to a cloud, pixels that are surrounded by other pixels that have already been classified as corresponding to a cloud;
up-sampling results of the morphological fill operation to increase resolution to an original resolution of the first and second image data;
performing a morphological dilation operation on results of the up-sampling to thereby produce dilated cloud detection data, wherein each pixel included in the dilated cloud detection data includes a respective cloud index value;
comparing the cloud index value, for each pixel of the dilated cloud detection data, to a threshold value; and
producing the cloud detection data based on results of the comparing the cloud index value, for each pixel of the dilated cloud detection data, to the threshold value.

10. A non-transitory processor readable storage device having processor readable code embodied on the processor read storage device, the processor readable code for programming one or more processors to perform a method comprising:
receiving first and second image data obtained, respectively, using the first and second sensor arrays carried by the satellite;
producing movement mask data based on dissimilarities identified between the first image data and the second image data;
producing cloud mask data based on spectral information included in one of the first and second image data;
intersecting the movement mask data with the cloud mask data to thereby produce intersection data; and
producing cloud detection data based on the intersection data.

11. The non-transitory processor readable storage device of claim 10, wherein:
the first image data includes first image information about a first geographic region;
the second image data includes second image information about the first geographic region, which differs from the first image information about the first geographic region included in the first image data;
the movement mask data indicates where it is likely that the dissimilarities between the first image data and the second image are due to movement of one or more objects within the first geographic region;
the cloud mask data indicates where it is likely, based on the spectral information included in the one of the first and second image data, that one or more clouds are represented within the one of the first and second image data;
the cloud detection data indicates where it is likely, based on the dissimilarities between the first image data and the second image data, as well as based on the spectral information included in the one of the first and second image data, that one or more clouds are represented within the one of the first and second image data;
a second satellite viewing angle associated with the second image data obtained using the second sensor array differs from a first satellite viewing angle associated with the first image data obtained using the first sensor array, with a difference between the first and second satellite viewing angles being a parallax angle; and
a second time at which part of the second image data corresponding to a piece of the first geographic region is obtained using the second sensor array differs from a first time at which part of the first image data corresponding to the piece of the first geographic region is obtained using the first sensor array, with a difference between the first and second times being a temporal offset.

12. The non-transitory processor readable storage device of claim 10, wherein:
the first image data obtained using the first sensor array includes first spectral band data corresponding to a first spectral band,
the second image data obtained using the second sensor array includes second spectral band data corresponding to a second spectral band that is adjacent to and thereby proximate in wavelength to the first spectral band, and
the producing movement mask data comprises:
performing edge detection on the first spectral band data and the second spectral band data to thereby produce first edge image data and second edge image data;
computing dissimilarity values between corresponding image chips within the first and second edge image data;
comparing the dissimilarity values to a threshold; and
producing the movement mask data based on results of the comparing the dissimilarity values to the threshold.

13. The non-transitory processor readable storage device of claim 10, wherein the producing cloud mask data based on spectral information included in one of the first and second image data, comprises:
computing chroma and lightness values for each pixel of a plurality of pixels of the one of the first and second image data;
computing a cloud index value, for each pixel of the plurality of pixels, based on the chroma and lightness values computed for the pixel;
comparing the computed cloud index value, for each pixel of the plurality of pixels, to a threshold value; and
classifying each pixel of the plurality of pixels as either corresponding to a cloud or not based on results of the comparisons to the threshold value.

14. The non-transitory processor readable storage device of claim 13, wherein the computing the cloud index value, for each pixel of the plurality of pixels, is performing using the following equation:

$$\text{index} = \frac{L}{aC^2 + b}$$

where
index is the cloud index value for the pixel,
L is the lightness value calculated for the pixel,
C is the chroma value calculated for the pixel, and
a and b are constants.

15. The non-transitory processor readable storage device of claim 13, wherein the producing cloud mask data further comprises, after the classifying each pixel of the plurality of pixels as either corresponding to a cloud or not:
performing a binary opening morphological operation on results of the classifying, to thereby reduce a number of false positives included in the cloud mask data before the cloud mask data is intersected with the movement mask data to produce the intersection data.

16. The non-transitory processor readable storage device of claim 10, wherein the producing cloud detection data, based on the intersection data, comprises:
identifying, based on the intersection data, one or more groups of pixels that may correspond to a cloud;
for each group of pixels that may correspond to a cloud, determining a magnitude of movement and a direction of movement of the group; and
clustering groups of pixels for which the determined magnitude of movement and the determined direction of movement are similar one another to thereby identify one or more distinct banks of clouds that are included within the first and second image data.

17. The non-transitory processor readable storage device of claim 16, wherein the producing the cloud detection data further comprises:
for each of the one or more distinct cloud banks identified as a result of the clustering, determining based on the first and second edge image data, additional pixels that correspond to the cloud bank;
classifying, as corresponding to a cloud, saturated pixels that are adjacent to another pixel that has already been classified as corresponding to a cloud;
performing a morphological fill operation to thereby classify, as corresponding to a cloud, pixels that are surrounded by other pixels that have already been classified as corresponding to a cloud;
up-sampling results of the morphological fill operation to increase resolution to an original resolution of the first and second image data;
performing a morphological dilation operation on results of the up-sampling to thereby produce dilated cloud detection data, wherein each pixel included in the dilated cloud detection data includes a respective cloud index value;
comparing the cloud index value, for each pixel of the dilated cloud detection data, to a threshold value; and
producing the cloud detection data based on results of the comparing the cloud index value, for each pixel of the dilated cloud detection data, to the threshold value.

18. A method for detecting clouds in satellite imagery captured using first and second sensor arrays that are carried by a satellite and physically offset from one another on the satellite, the method comprising:
producing movement mask data based on first image data and the second image data, obtained, respectively, using the first and second sensor arrays carried by the satellite, the first image data including first image information about a first geographic region, and the second image data including second image information about the first geographic region, which differs from the first image information about the first geographic region included in the first image data;
producing cloud mask data based on spectral information included in one of the first and second image data, the cloud mask data indicating where it is likely, based on the spectral information included in the one of the first and second image data, that one or more clouds are represented within the one of the first and second image data; and
producing cloud detection data based on the movement mask data and the cloud mask data, the cloud detection data indicating where it is likely, based on both the movement mask data and the cloud mask data, that one or more clouds are represented within the one of the first and second image data.

19. The method of claim 18, wherein the producing movement mask data comprises:
performing edge detection on the first image data and the second image data to thereby produce first edge image data and second edge image data;
computing dissimilarity values between corresponding image chips within the first and second edge image data; and
producing the movement mask data based on results of comparing the dissimilarity values to a threshold.

20. The method of claim 18, wherein the producing cloud mask data based on spectral information included in one of the first and second image data, comprises:
computing color transformation values for each pixel of a plurality of pixels of the one of the first and second image data;
computing a cloud index value, for each pixel of the plurality of pixels, based on the color transformation values computed for the pixel;
comparing the computed cloud index value, for each pixel of the plurality of pixels, to a threshold value; and
classifying each pixel of the plurality of pixels as either corresponding to a cloud or not based on results of the comparisons to the threshold value.

21. A system for detecting clouds in satellite imagery captured using first and second sensor arrays that are carried by a satellite and physically offset from one another on the satellite, the system comprising:
one or more processors configured to
produce movement mask data based on first image data and second image data, obtained, respectively, using the first and second sensor arrays carried by the satellite, the first image data including first image information about a first geographic region, and the second image data including second image information about the first geographic region, which differs from the first image information about the first geographic region included in the first image data;
produce cloud mask data based on spectral information included in one of the first and second image data, the cloud mask data indicating where it is likely, based on the spectral information included in the one of the first and second image data, that one or more clouds are represented within the one of the first and second image data; and
produce cloud detection data based on the movement mask data and the cloud mask data, the cloud detection data indicating where it is likely, based on both the movement mask data and the cloud mask data, that one or more clouds are represented within the one of the first and second image data.

* * * * *

UNITED STATES PATENT AND TRADEMARK OFFICE
CERTIFICATE OF CORRECTION

| | |
|---|---|
| PATENT NO. | : 11,010,606 B1 |
| APPLICATION NO. | : 16/685609 |
| DATED | : May 18, 2021 |
| INVENTOR(S) | : Bader |

It is certified that error appears in the above-identified patent and that said Letters Patent is hereby corrected as shown below:

On the Title Page

Item (57) (Line 5): After "based" and before "first" insert -- on --.

Item (57) (Line 8): After "included" and before "one" insert -- in --.

In the Claims

Column 21, Line 40 (Claim 3): After "the" and before "image" delete "second" and insert -- first --.

Column 22, Line 59 (Claim 8): After "similar" and before "one" insert -- to --.

Column 25, Line 13 (Claim 16): After "similar" and before "one" insert -- to --.

Signed and Sealed this
Seventh Day of June, 2022

Katherine Kelly Vidal
*Director of the United States Patent and Trademark Office*